US007942663B2

(12) United States Patent
Ciccone

(10) Patent No.: US 7,942,663 B2
(45) Date of Patent: *May 17, 2011

(54) INJECTION MOLDING VALVE GATE SYSTEM AND ACTIVATING MECHANISM

(75) Inventor: Vince Ciccone, Kleinberg (CA)

(73) Assignee: Injectnotech Inc., Missisauga, Ontario (CA)

( * ) Notice: Subject to any disclaimer, the term of this patent is extended or adjusted under 35 U.S.C. 154(b) by 227 days.

This patent is subject to a terminal disclaimer.

(21) Appl. No.: 12/246,412

(22) Filed: Oct. 6, 2008

(65) Prior Publication Data

US 2009/0026404 A1 Jan. 29, 2009

Related U.S. Application Data

(63) Continuation of application No. 10/938,787, filed on Sep. 9, 2004, now Pat. No. 7,452,201.

(60) Provisional application No. 60/502,341, filed on Sep. 12, 2003.

(51) Int. Cl.
*B29C 45/23* (2006.01)

(52) U.S. Cl. ........................................ 425/564; 425/566

(58) Field of Classification Search .................. 425/562, 425/563, 564, 565, 566
See application file for complete search history.

(56) References Cited

U.S. PATENT DOCUMENTS 5,387,099 A * 2/1995 Gellert ........................... 425/564
7,452,201 B2 * 11/2008 Ciccone ......................... 425/564

* cited by examiner

*Primary Examiner* — Tim Heitbrink
(74) *Attorney, Agent, or Firm* — Kilpatrick Townsend & Stockton LLP

(57) ABSTRACT

A valve gate system for an injection molding machine, having a valve gate unit configured to be in contact with a manifold of an injection molding machine for delivering a molten plastic flow from a hot runner system to an injection chamber. The valve gate unit has a valve pin for controlling the flow of the molten plastic from a hot runner system to an injection chamber and an activating unit coupled with the valve gate unit. The activating unit is configured to be mounted external to a mold unit that houses the injection chamber. In addition, the activating unit has an element that extends through the mold unit to engage the valve pin, so as to control the molten plastic flow from a runner system to an injection chamber.

10 Claims, 33 Drawing Sheets

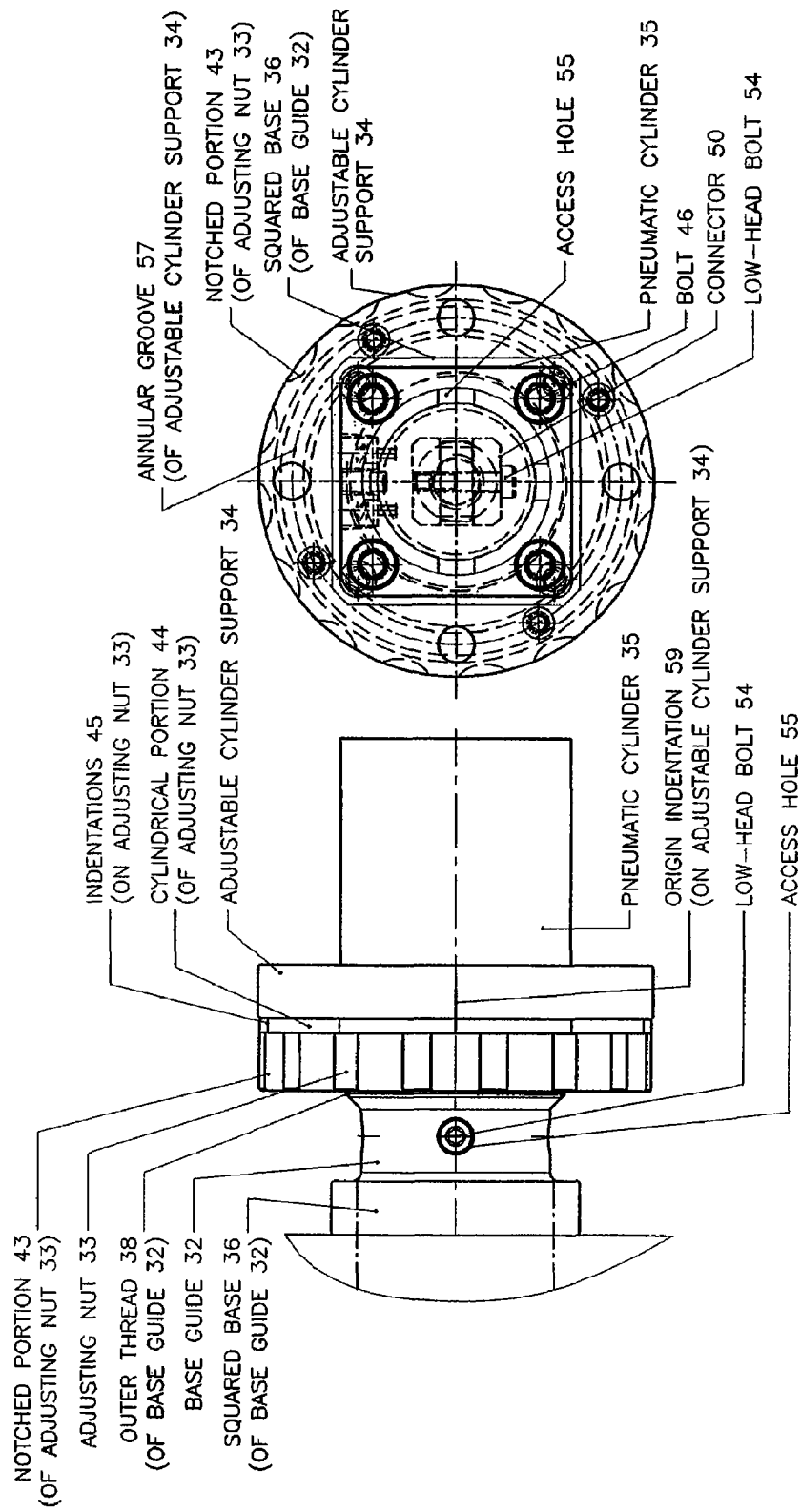

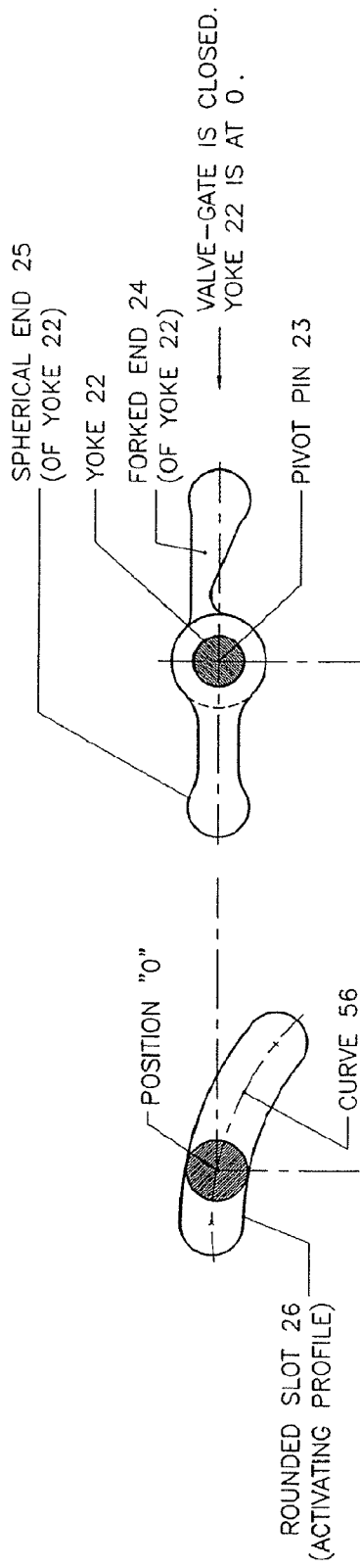
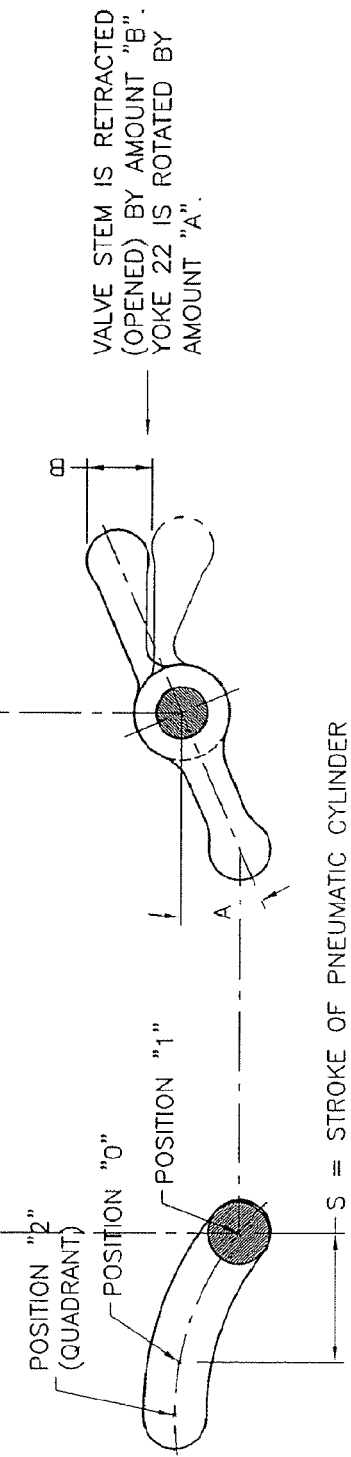
FIGURE 8
FIGURE 9

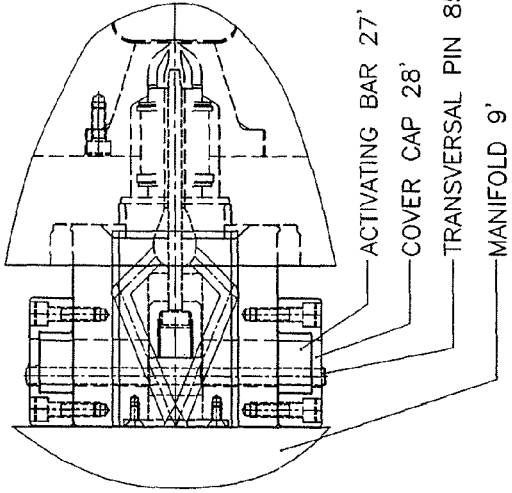
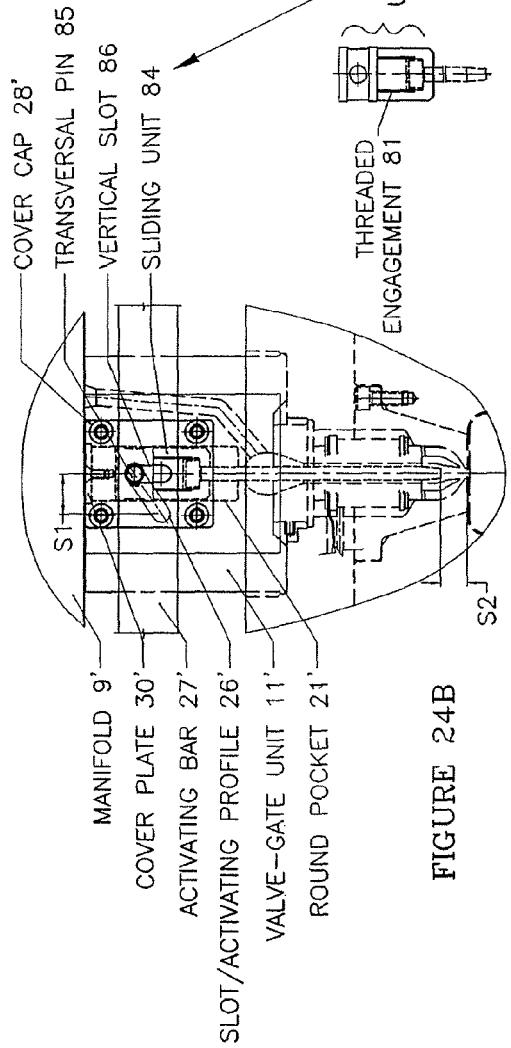
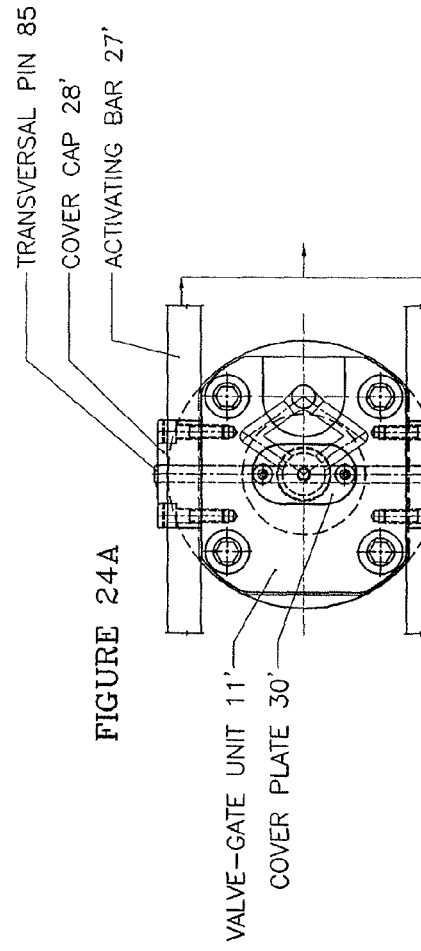

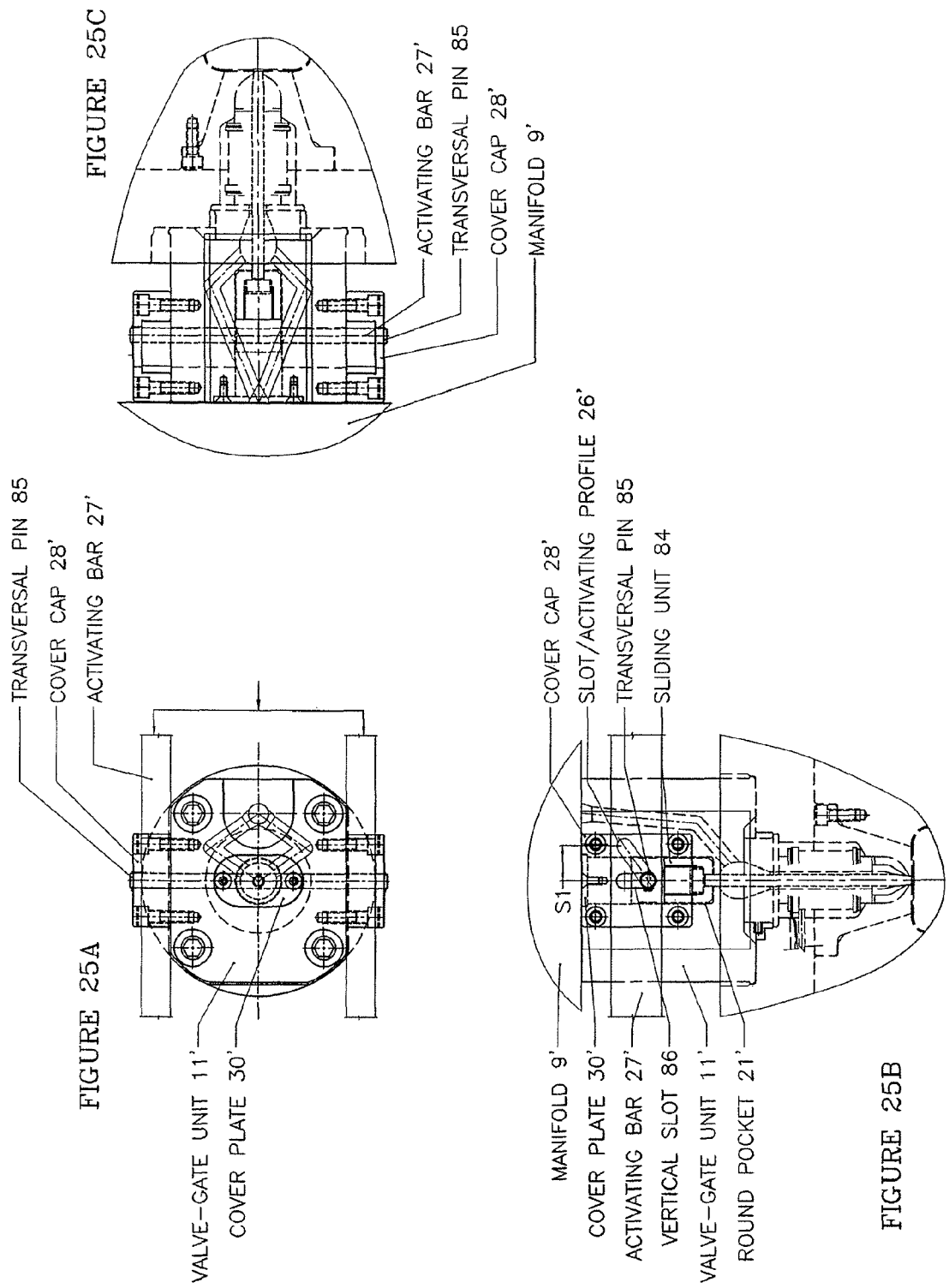

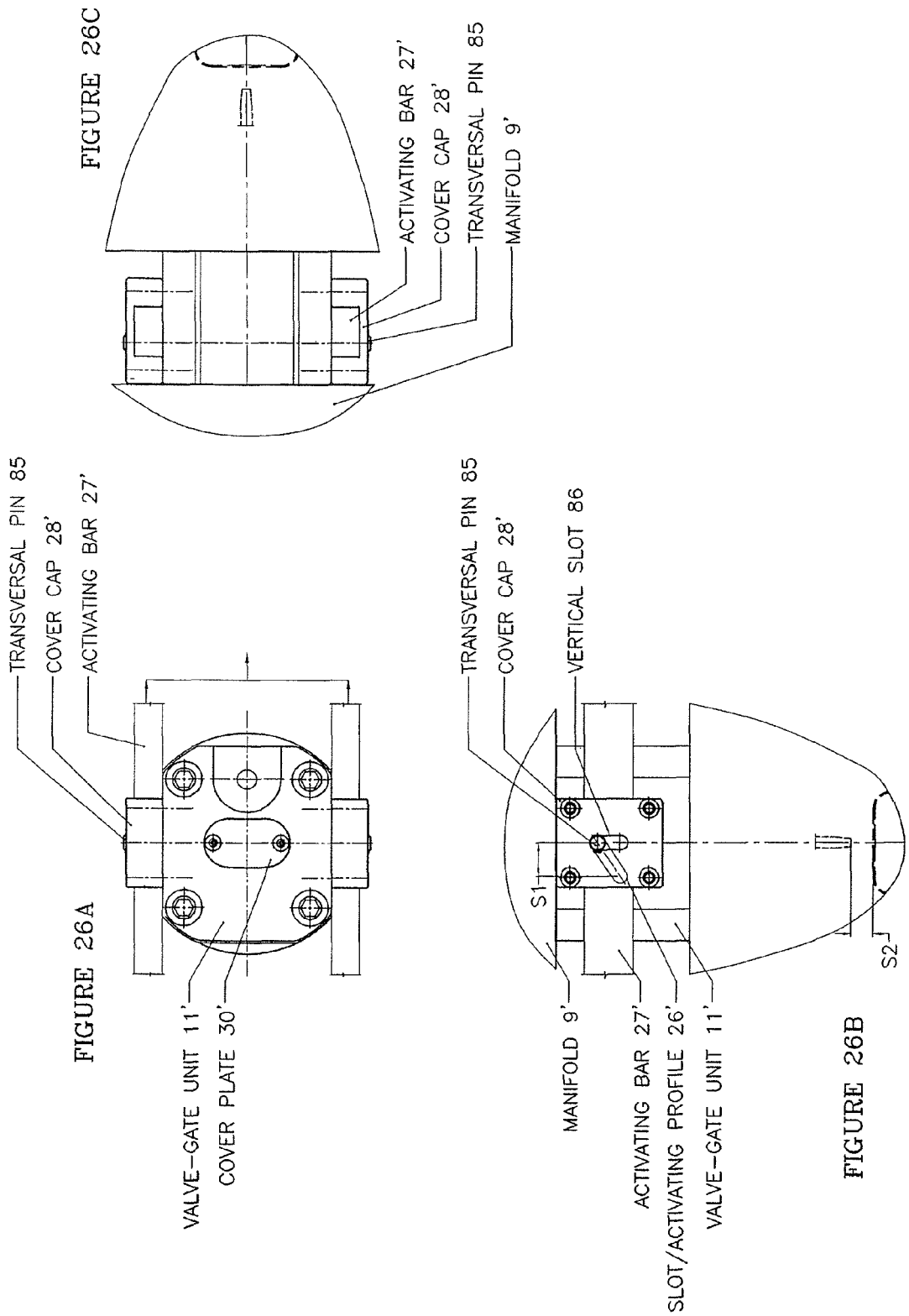

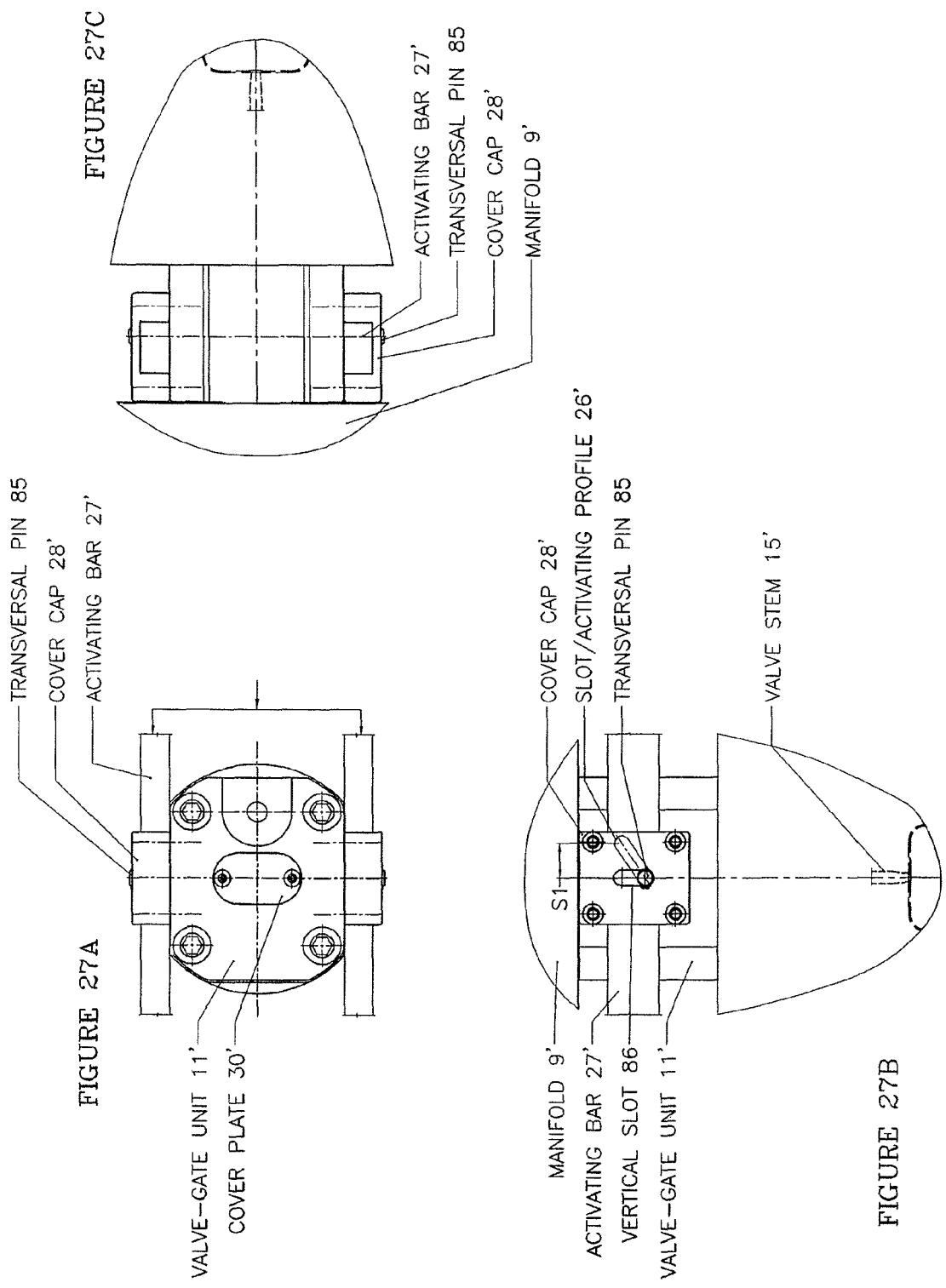

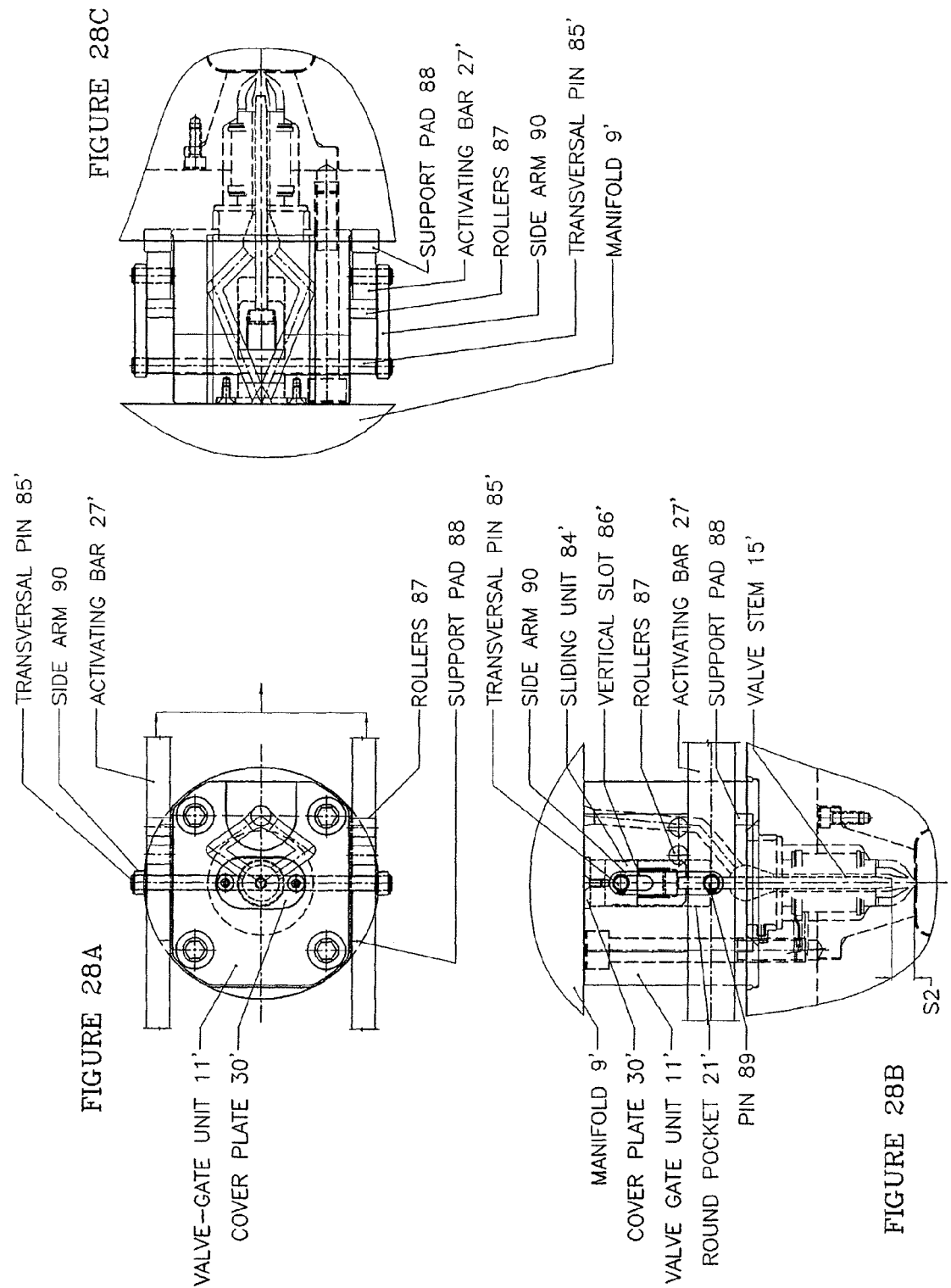

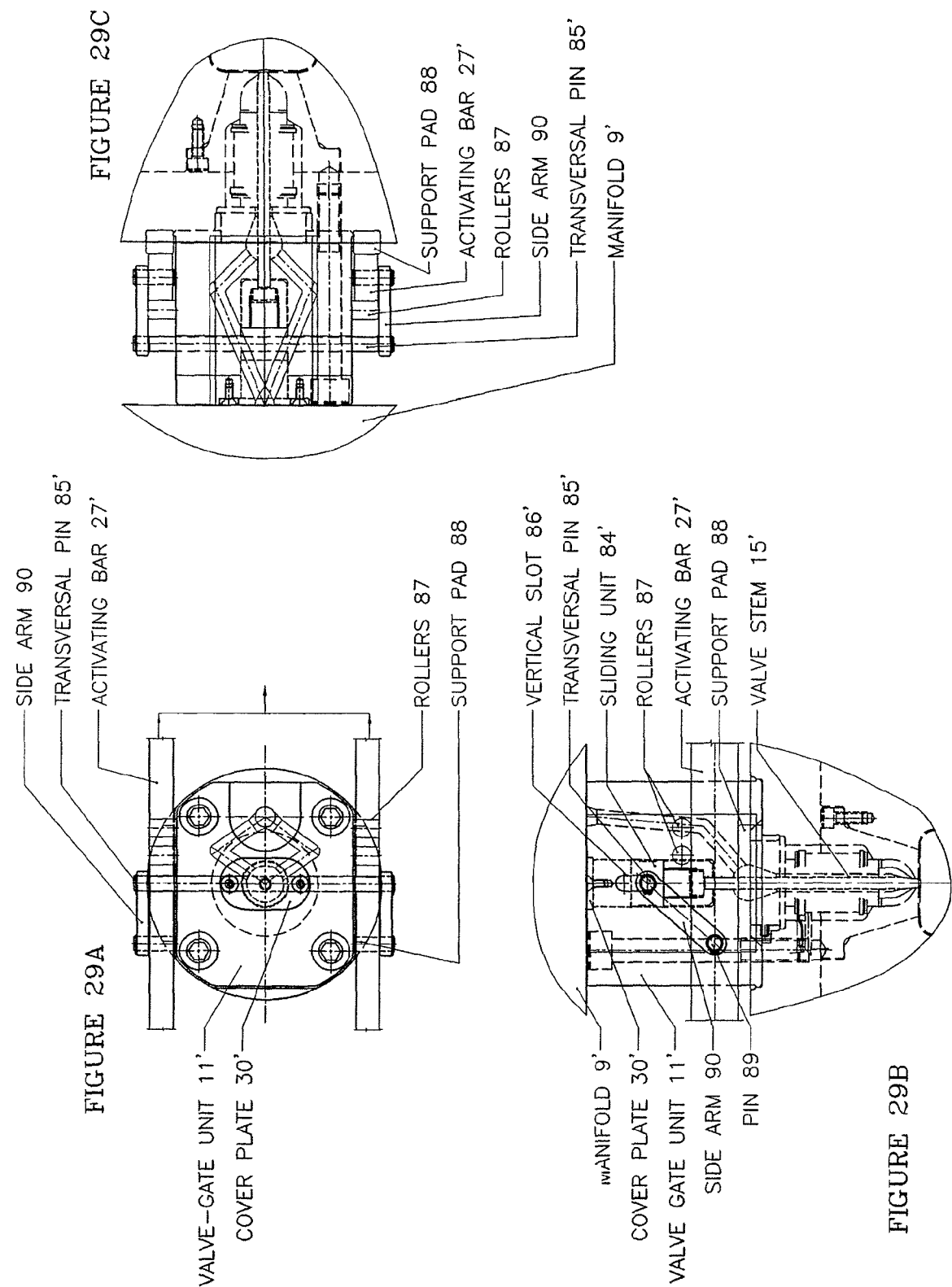

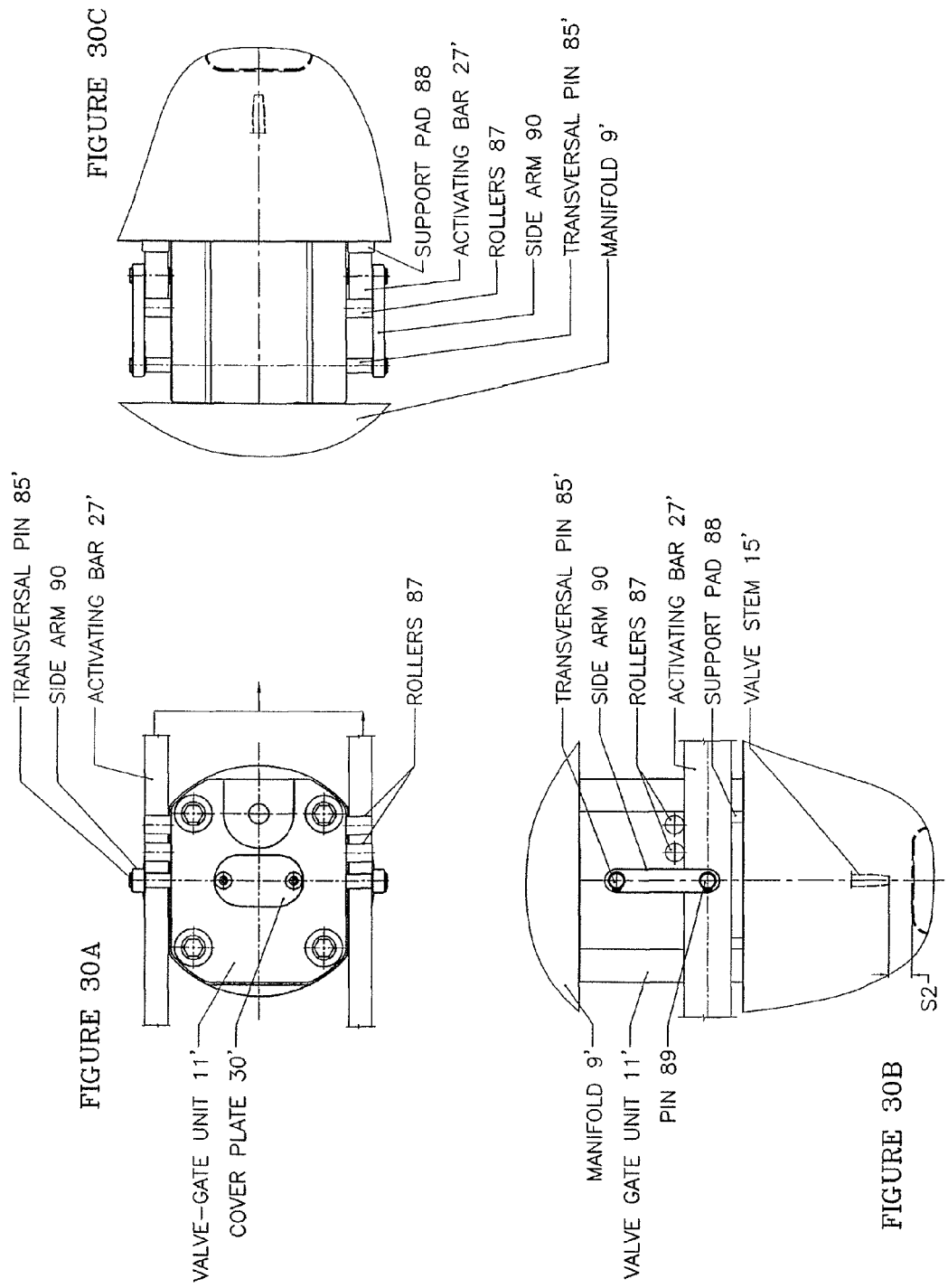

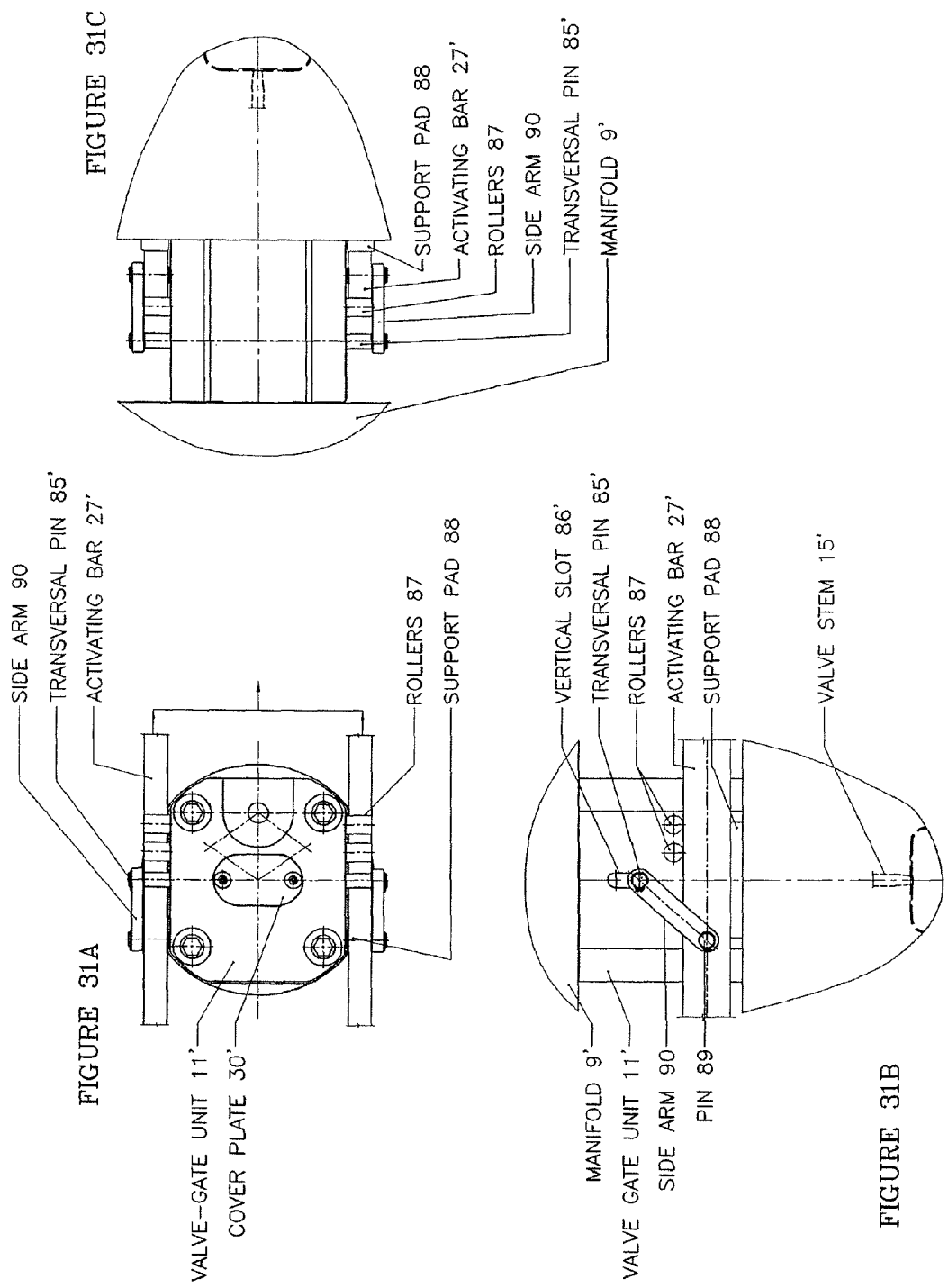

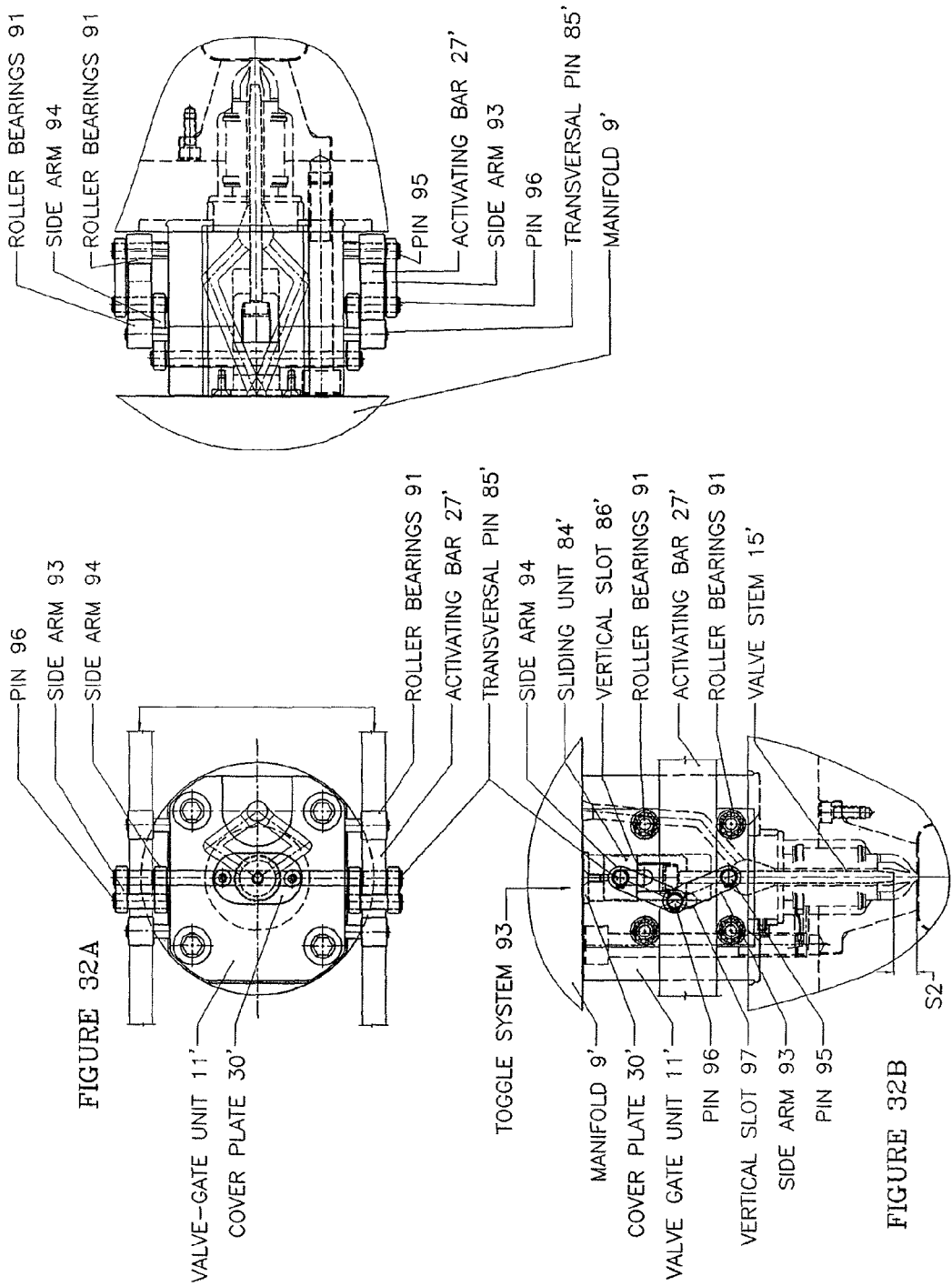

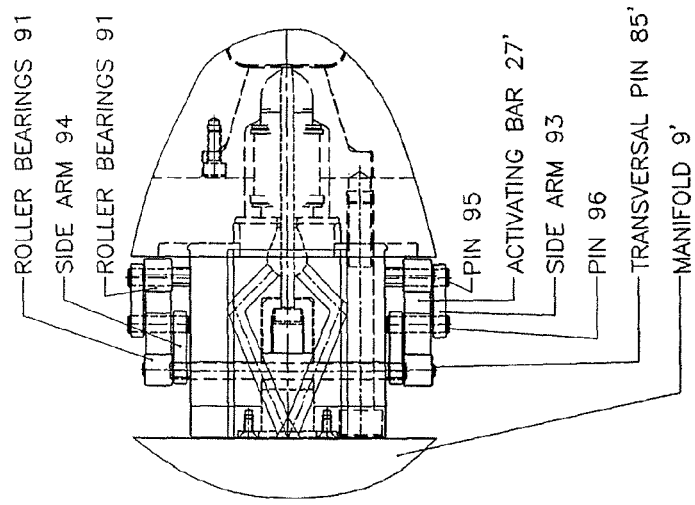
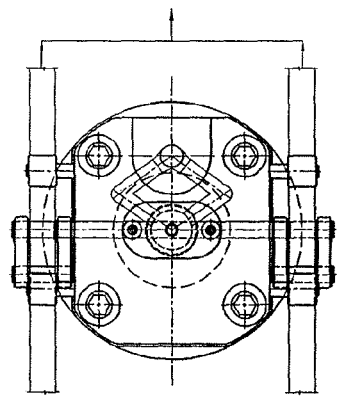
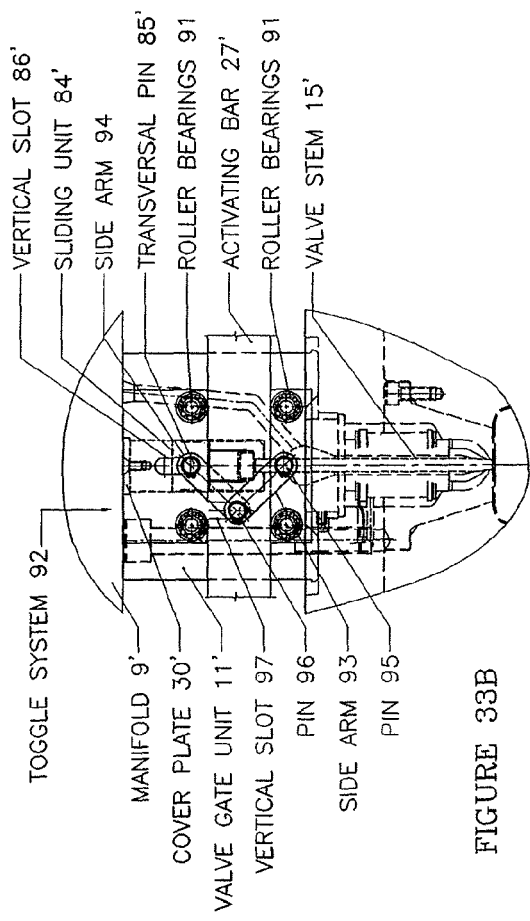
FIGURE 33C
FIGURE 33A
FIGURE 33B

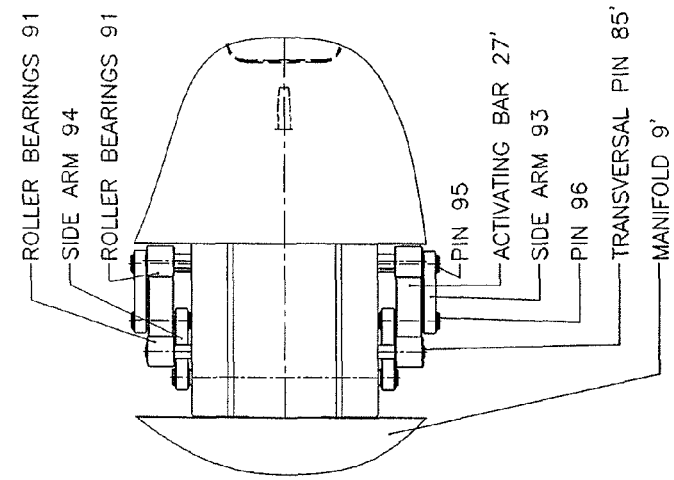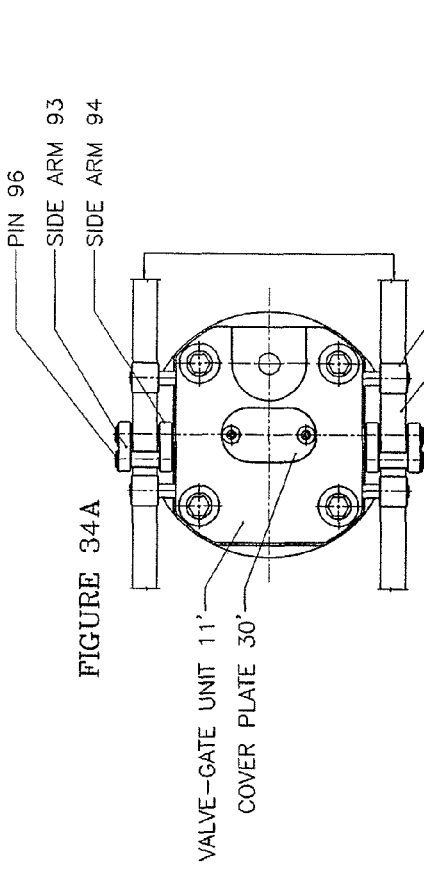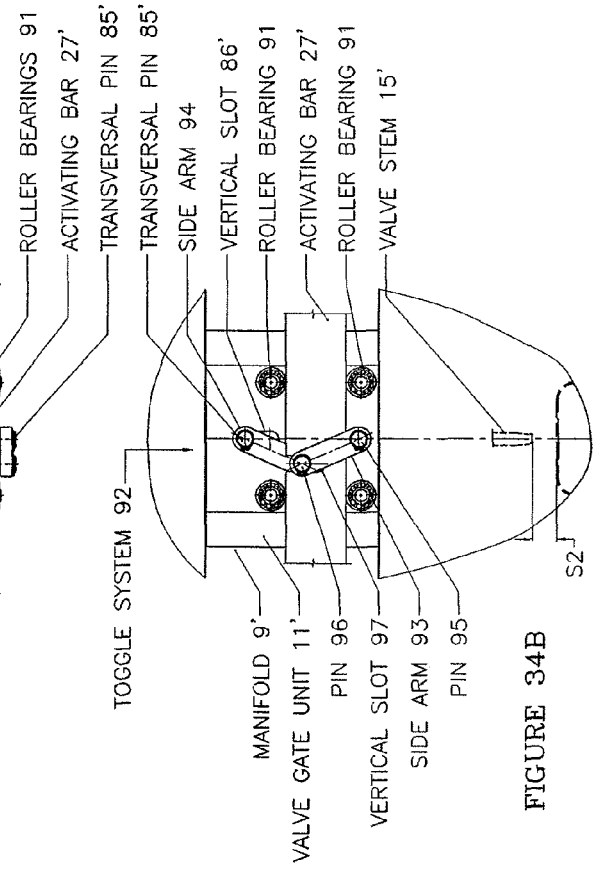

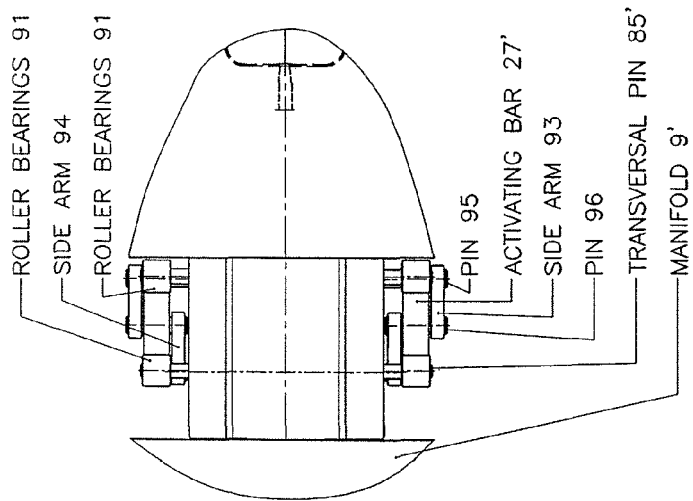
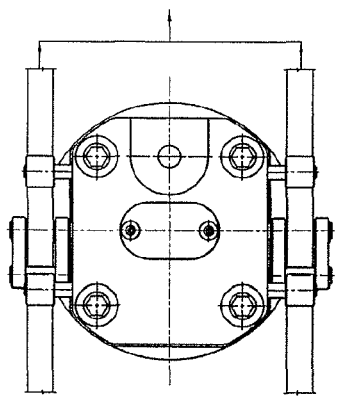
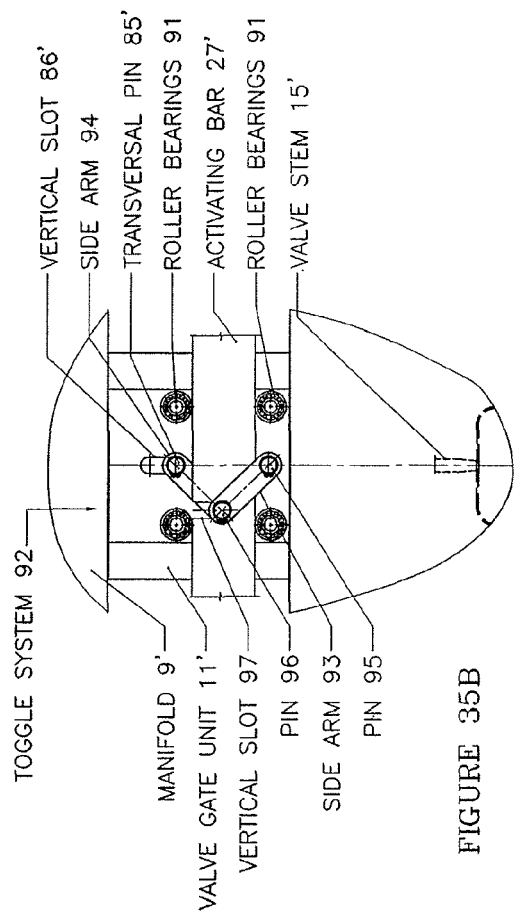

ND ACTIVATING MECHANISM

INJECTION MOLDING VALVE GATE SYSTEM AND ACTIVATING MECHANISM

CROSS-REFERENCES TO RELATED APPLICATIONS

The present application claims priority to U.S. Provisional Patent Application No. 60/502,341, filed Sep. 12, 2003, the teachings of which are incorporated herein by reference for all purposes.

BACKGROUND OF THE INVENTION

The present invention relates to injection molding machines, and in particular to valve gate systems for injection molding machines, and injection molding machines having molds using valve-gate systems for controlling the injection of molten plastic into the mold chamber.

Valve-gate systems have the advantage of creating a clean, flush gate mark, when minimal vestige height is required on the molded part. Apart from a cosmetic viewpoint, larger orifices allowed by valve gates prevent drooling, reduce shear heat and molded-in stress, provide easier filing and reduce injection pressure. Valve-gates are typically part of a larger unit (commonly referred to as "valve-gate unit") that is mounted behind the gate area, in firm contact with the hot runner's manifold. More issues regarding existing valve-gate unit designs are raised below.

While existing valve gate systems create quality gates on molded parts, they also suffer from certain shortcomings, as described below.

- The valve pin or stem of a valve gate unit is actuated typically by pneumatic or hydraulic systems, included in the body of the valve-gate unit, which contributes to increase valve pin length.
- Pneumatic or hydraulic actuating systems included in heated valve-gate units are continuously subjected to high temperatures, and therefore likely to suffer from problems associated with thermal expansion.
- Pneumatic or hydraulic actuating systems mounted behind the manifold require cooling. If no cooling is available, they generally will require regular maintenance checks (e.g., to inspect and/or change o-rings, etc.), which adds to the overall cost of the operation of the machine.
- Presence of pneumatic or hydraulic systems in valve-gate units may limit the use of back-to-back gating for stack molds. In such cases, when using a single manifold, staggered placement of gates may be required, resulting in increased projected area. It is noted that back-to-back mounting can be achieved if using multiple manifolds, but, in such cases, equalizing flow in all runners (e.g., to avoid preferential flow) becomes an issue.
- Many of the existing valve-gate systems have no form of adjustment of the valve pin length. An adjustment of some sort is typically necessary to bring the valve pin flush with surrounding molding surface. Existing systems that have this adjustment still require a fair amount of work, even with the mold in the injection press, resulting in increased downtime.

There is therefore a need for an improved valve-gate unit that does not suffer from these issues.

BRIEF SUMMARY OF THE INVENTION

The present invention provides a valve gate system and an injection molding machine having such a valve gate system, where the activating unit of the valve gate system is located in an unheated area of the injection molding machine and where an element of the activating unit extends through the injection molding machine to engage and activate the valve gate of the valve gate unit.

In one embodiment, the present invention provides a valve gate system for an injection molding machine, having a valve gate unit configured to be in contact with a manifold of an injection molding machine for delivering a molten plastic flow from a hot runner system to an injection chamber. The valve gate unit has a valve pin for controlling the flow of the molten plastic from a hot runner system to an injection chamber and an activating unit coupled with the valve gate unit. The activating unit is configured to be mounted external to a mold unit that houses the injection chamber. In addition, the activating unit has an element that extends through the mold unit to engage the valve pin, so as to control the molten plastic flow from a runner system to an injection chamber.

For a further understanding of the nature and advantages of the invention, reference should be made to the following description taken in conjunction with the accompanying drawings. The drawings described below are merely exemplary drawings of various embodiments of the present invention which should not limit the scope of the disclosure and claims herein. One of ordinary skill would recognize many variations, alternatives, and modifications. These variations, alternatives, and modifications are intended to be included within the scope of the present invention, which is described herein.

BRIEF DESCRIPTION OF THE DRAWINGS

FIGS. 6A and 6B are exemplary schematic diagrams showing additional detail views of the activating unit of FIG. 3.

FIGS. 8-9 are exemplary schematic diagrams showing engagement positions on the slot of FIG. 7A.

FIG. 15 shows the mold of FIG. 14 opened, for example, for the removal of valve gate unit(s).

FIGS. 24A-C are exemplary schematic diagrams showing a first alternate embodiment of the valve gate unit in accordance with the present invention.

FIGS. 25A-C show the embodiment of FIGS. 24A-C with the valve gate closed.

FIGS. 26A-C are simplified views of the embodiment of FIGS. 24A-C, shown with the valve gate open.

FIGS. 27A-C simplified views of simplified views of this embodiment, shown with the valve gate closed.

FIGS. 28A-C are exemplary schematic diagrams showing a second alternate embodiment of the valve gate unit in accordance with the present invention.

FIGS. 29A-C show the embodiment of FIGS. 28A-C with the valve gate closed.

FIGS. 30A-C are simplified views of the embodiment of FIGS. 28A-C, with the valve gate open.

FIGS. 31A-C are simplified views of the embodiment of FIGS. 28A-C, with the valve gate closed.

FIGS. 32A-C are exemplary schematic diagrams showing a third alternate embodiment of the valve gate unit in accordance with the present invention.

FIGS. 33A-C show the embodiment of FIGS. 32A-C with the valve gate closed.

FIGS. 34A-C are simplified views of the embodiment of FIGS. 32A-C, with the valve gate open.

FIGS. 35A-C are simplified views of the embodiment of FIGS. 32A-C, with the valve gate closed.

DETAILED DESCRIPTION OF THE INVENTION

The embodiments of the present invention, described herein, may be used for single cavity molds, as well as with multi-cavity (e.g., single-face and stack) molds.

The embodiments of the present invention use a combination of pneumatic-mechanical actuating system for the movement of the valve pin. The pneumatic component (e.g., pneumatic cylinder) of the actuating system is brought outside the mold, leaving only mechanical components in the mold. The pneumatic cylinder runs cold, which helps protect its components from heat expansion and extend the life of its seals (e.g., o-rings). Also, maintenance checks and service are easier for cylinders located outside the mold, where they are easily accessible. The pneumatic actuating component being removed from the valve-gate unit, enables the back-to-back mounting of valve-gate units for stack molds.

Figure 1:
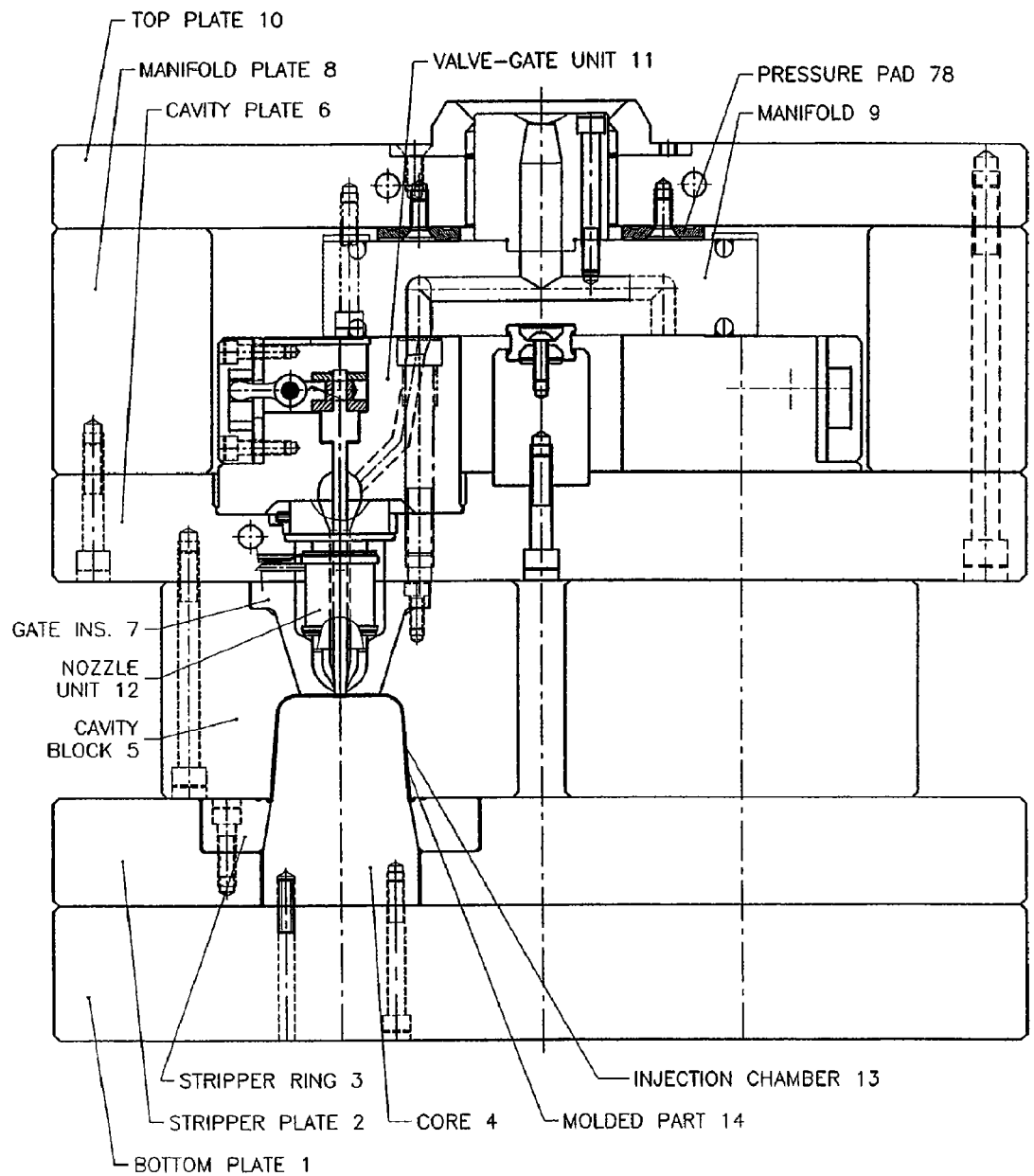
FIG. 1 is an exemplary schematic diagram of one embodiment of a valve gate unit in accordance with the present invention shown as a part of a single-face multi-cavity mold.

An embodiment of the valve-gate unit in accordance with the present invention is shown in FIG. 1 as part of a single-face multi-cavity mold. Such a mold typically includes the following items: a bottom plate 1, stripper plate 2, stripper rings 3 (secured to stripper plate 2), cores 4 (secured to bottom plate 1), cavity blocks 5 secured to cavity plate 6, gate inserts 7 (secured in cavity blocks 5), manifold plate 8, housing manifold 9, top plate 10, and valve-gate units 1 (secured to cavity plate 6). It should be understood that additional components (not shown or described here) can be part of such a mold, and different mounting methods than the one described can be used, without departing from the scope of the present invention.

In a manner typical to the injection process, at the beginning of each injection cycle the mold closes and molten plastic is injected, through the hot runner system (e.g., as shown including a manifold 9 and a nozzle unit 12), in the injection chambers 13 formed between the active faces of cores 4 and cavity blocks 5. The active end of nozzle unit 12 shown in FIG. 1 is housed in gate insert 7, but can be housed directly in a pocket in cavity block 5 (e.g., gate insert 7 is optional). At the end of the injection cycle, the mold opens and the stripper plate 2 moves away from bottom plate 1 for a short distance, causing the stripper rings 3 to strip the molded parts 14 off cores 4. The molded parts 14 fall through the opening between the mold halves, and the injection machine closes the mold for the beginning of a new cycle.

Figure 3:
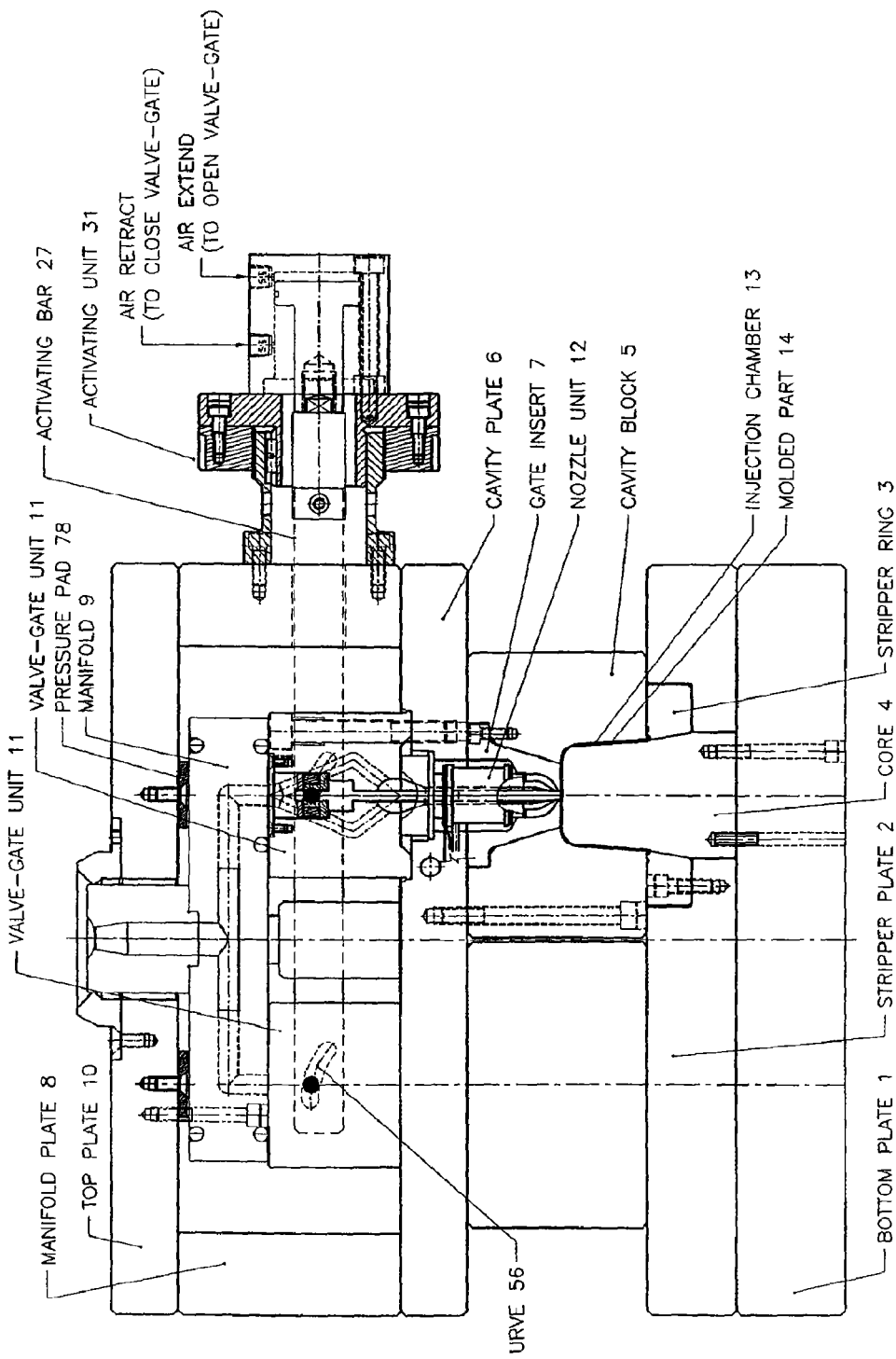
FIG. 3 is an exemplary schematic diagram of one embodiment of a valve gate unit and the activating unit in accordance with the present invention shown as a part of a single-face multi-cavity mold.

The valve-gate system in accordance with the embodiments of the present invention includes two main units: the valve-gate unit 11 (as shown in FIG. 1), secured to cavity plate 6 and in contact with manifold 9, and the activating unit 31 (as shown in FIG. 3), mounted on the side of the mold, and having elements that go through the mold, to valve-gate units 11.

Melt-flow channels through manifold 9 bring molten plastic to valve-gate units 11. Valve-gate units 11 can have one flow channel connecting to nozzle unit 12, or they can have two flow channels (e.g., as shown in FIG. 3), diverging from a common entry point (e.g., matching exit channel of manifold 9), and converging at interface with nozzle unit 12. Sealing between manifold 9 and valve-gate unit 11, and between valve-gate unit 11 and nozzle unit 12, is achieved by the thermal expansion of these components. In single-face molds, pressure pads 78 are mounted between manifold 9 and top plate 10, in line with the gate (one pressure pad for each injection point—e.g., see FIG. 1). Pressure pads 78 are used to counteract the injection pressure from the gate, and aid with sealing when components expand during mold cycles. In stack molds with back-to-back gating, pressure pads may not be needed as the injection pressures equalize on sides of manifold.

Figure 2:
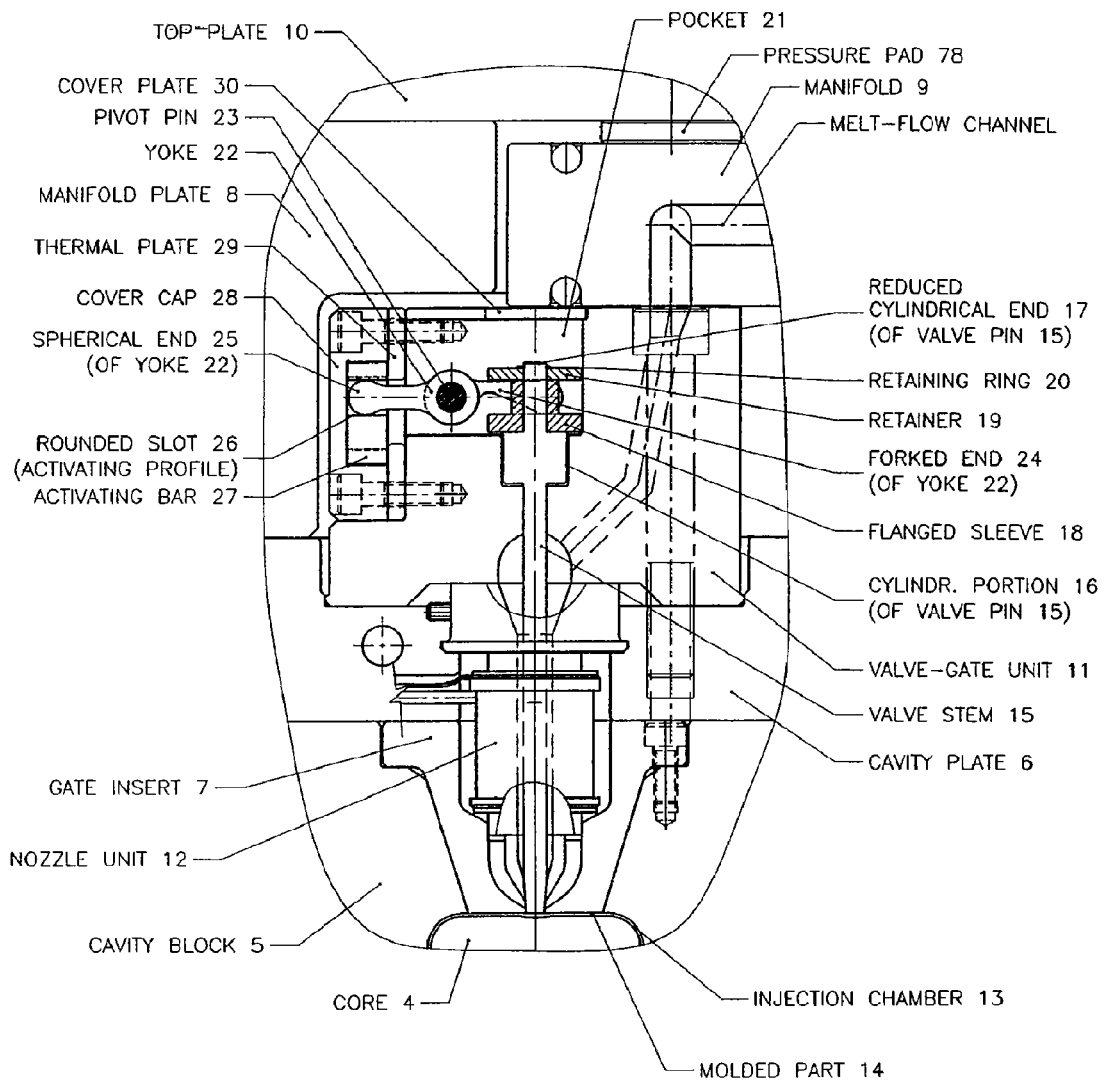
FIG. 2 is an exemplary schematic diagram showing an enlarged detail view of the valve-gate unit of FIG. 1.

An enlarged detail of the valve-gate unit 11 from FIG. 1 is shown in FIG. 2. It includes a valve pin or stem 15 going through nozzle unit 12 and through a central hole in the body of valve-gate unit 11. It has an enlarged cylindrical portion 16, followed by a reduced cylindrical end 17. A flanged sleeve 18 is mounted on this end, followed by a retainer 19, these two components being locked in place with a retaining ring 20. Although these items are employed and described in the present design, it should be understood that any system producing a similar result could be used on this end of valve pin 15. Flanged sleeve 18 and retainer 19 move in a pocket 21 in the body of valve-gate unit 11. Pocket 21 is round on one side, and open to the other side, towards the exterior of the body of valve-gate unit 11. A yoke 22 is located in the open end of pocket 21, pivoting around a pivot-pin 23 secured in the body of valve-gate unit 11. The forked end 24 of yoke 22 is located in the space between flanged sleeve 18 and retainer 19 (mounted on reduced cylindrical end 17 of valve pin 15). Yoke 22 has a spherical end 25 on the opposite side, which can move in a rounded slot/activating profile 26 in an activating bar 27. A cover cap 28, bolted to body of valve-gate unit 11, acts as guide for activating bar 27. A thermal plate 29 prevents heat transfer from body of valve-gate unit 11, which is heated, to activating bar 27 and cover cap 28. A cover plate 30 is bolted at top of valve-gate unit 11, to separate pocket 21 from manifold 9.

Figure 4:
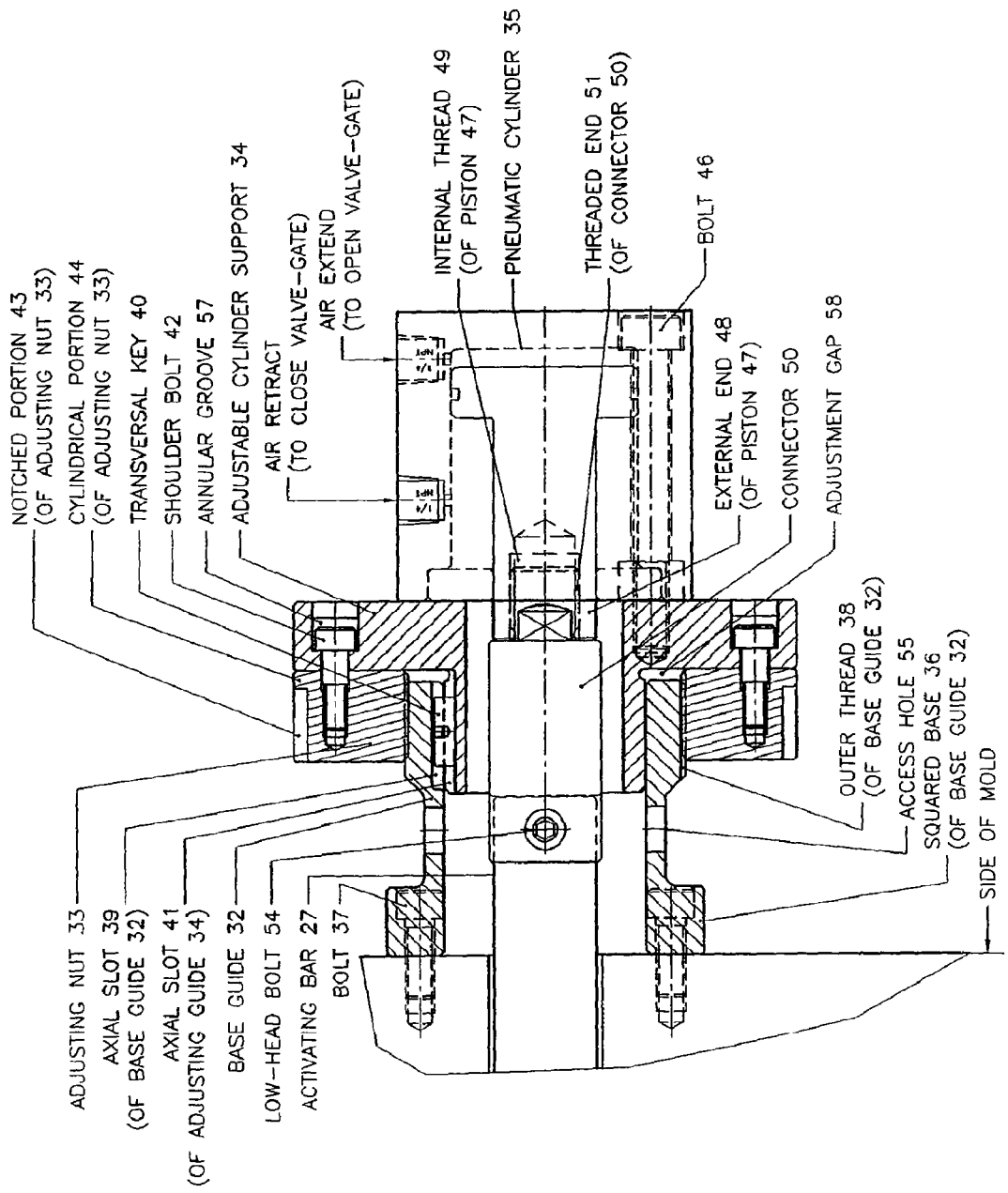
FIG. 4 is an exemplary schematic diagram showing an enlarged detail view of the activating unit of FIG. 3.
Figure 5:
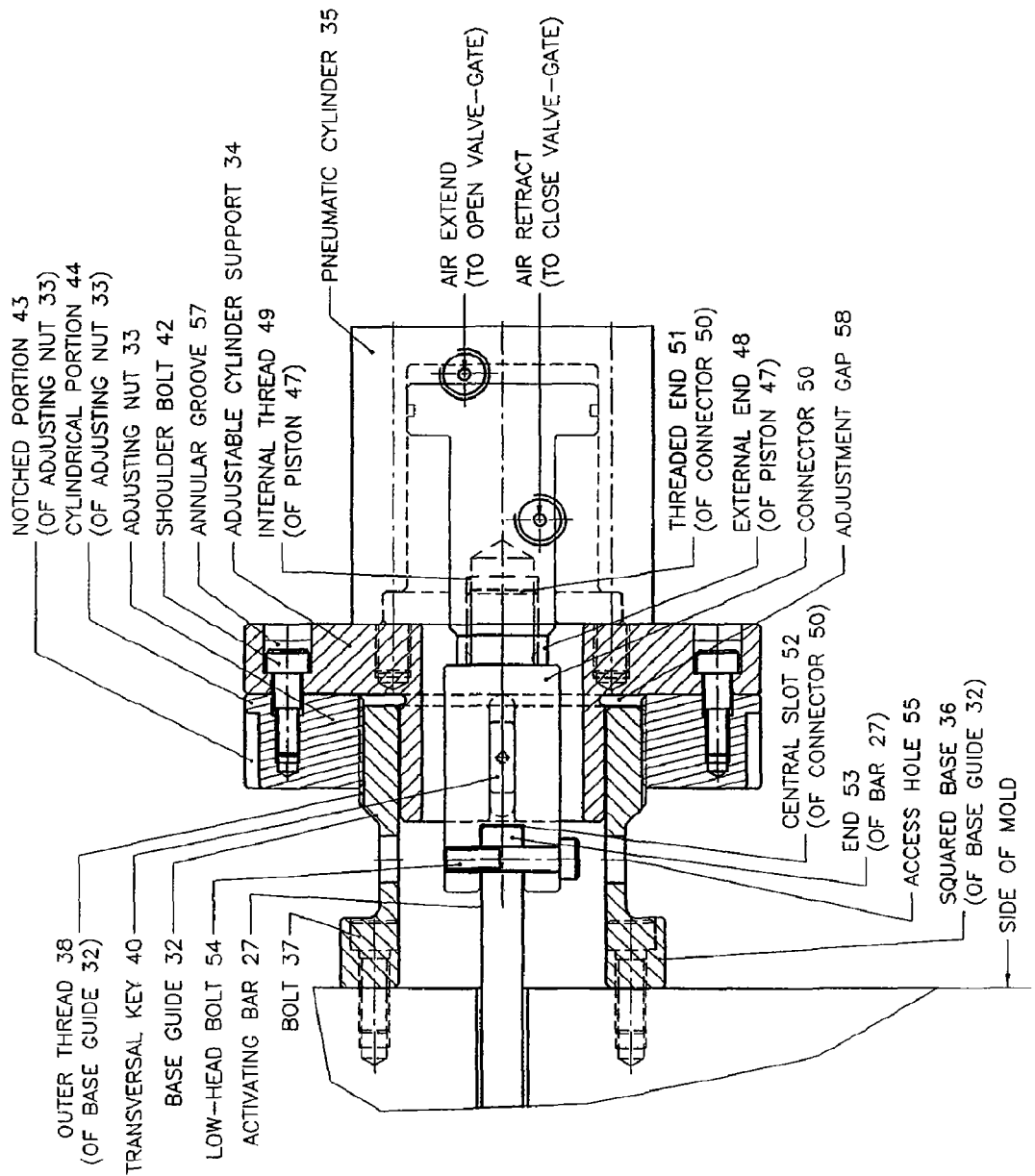
FIG. 5 is an exemplary schematic diagram showing another enlarged detail view of the activating unit of FIG. 3.

One activating bar 27 can be used to activate several valve-gate units 11 located along the same axial line. The activating bar 27 extends to one side of the mold, where it is connected to the activating unit 31, as shown in FIG. 3. An enlarged detail of the activating unit 31 of FIG. 3 is shown in FIG. 4. The activating unit 31 includes a base guide 32, an adjusting nut 33, an adjustable cylinder support 34 and a pneumatic cylinder 35. Base guide 32 is a round piece, extended with a squared base 36 that is secured to the side of the mold with bolts 37 (as shown in FIGS. 4, 5 and 6B). On the opposite end, base guide 32 has an outer thread 38, for engagement of adjusting nut 33. Base guide 32 has a central cylindrical hole with one axial slot 39. Adjustable cylinder support 34 is in the shape of a sleeve with a flanged end. A transversal key 40 is press-fit in an axial slot 41 on the outer surface (on the sleeve portion) of adjustable cylinder support 34. Sleeve portion of adjustable cylinder support 34 is inserted in central hole of base guide 32, with transversal key 40 sliding in axial slot 39. Transversal key 40 prevents rotation of adjustable cylinder support 34 in reference with base guide 32. Adjustable cylinder support 34 is loosely secured to adjusting nut 33 with shoulder bolts 42. As shown in FIG. 6A, outer surface of adjusting nut 33 has a notched portion 43 (for ease of handling), extending with a narrow cylindrical portion 44, marked with a number of indentations 45. One "origin" indentation 59 is marked on the outer surface of flange portion of adjustable cylinder support 34. Indentations 45 are used for precise adjustment in reference with "origin" indentation 59.

Pneumatic cylinder 35 is secured onto the end face of adjustable cylinder support 34 with bolts 46, as shown in FIG. 4. External end 48 of piston 47 of pneumatic cylinder 35 has an internal thread 49. A connector 50, in the shape of a square prism, has a threaded extension 51 at one end (for engagement in piston 47) and a central slot 52 at the other end (as shown in FIG. 5, which is a top view of system from FIG. 4). End 53 of activating bar 27 is secured in central slot 52 with a low-head bolt 54. Four (4) access holes 55 are located, at 90° intervals, on middle portion of base guide 32, to provide access to low-head bolt 54. Piston 47 of pneumatic cylinder 35 actuates connector 50, which in turn directs activating bar 27 in a push-pull movement. Bar 27 has one rounded slot/activating profile 26 for each valve-gate unit 11 it activates. Activating slot 26 runs along a curve/spline 56 (as shown in FIGS. 3, 7A, 8, 9, 10, and 14), and holds the spherical end 25 of yoke 22 previously described. Yoke 22 cannot move axially (in the direction of movement of activating bar 27), as it is held in body of valve-gate unit 11, but can pivot around pivot pin 23. The push-pull movement of activating bar 27 makes the rounded slot 26 guide the spherical end 25 of yoke 22 in an up-and-down movement, in a manner that will be described in more detail later. In other words, the up-and-down movement of the spherical end 25 causes yoke 22 to pivot around pivot-pin 23, which makes the forked end 24 of yoke 22 move down-and-up respectively, bringing the valve pin 15 with it. Valve pin 15 opens and close once per injection cycle. The pneumatic cylinder 35 receives a signal from the injection machine, which correlates movement of valve pin 15 with mold cycles.

Figures 7A, 7B:
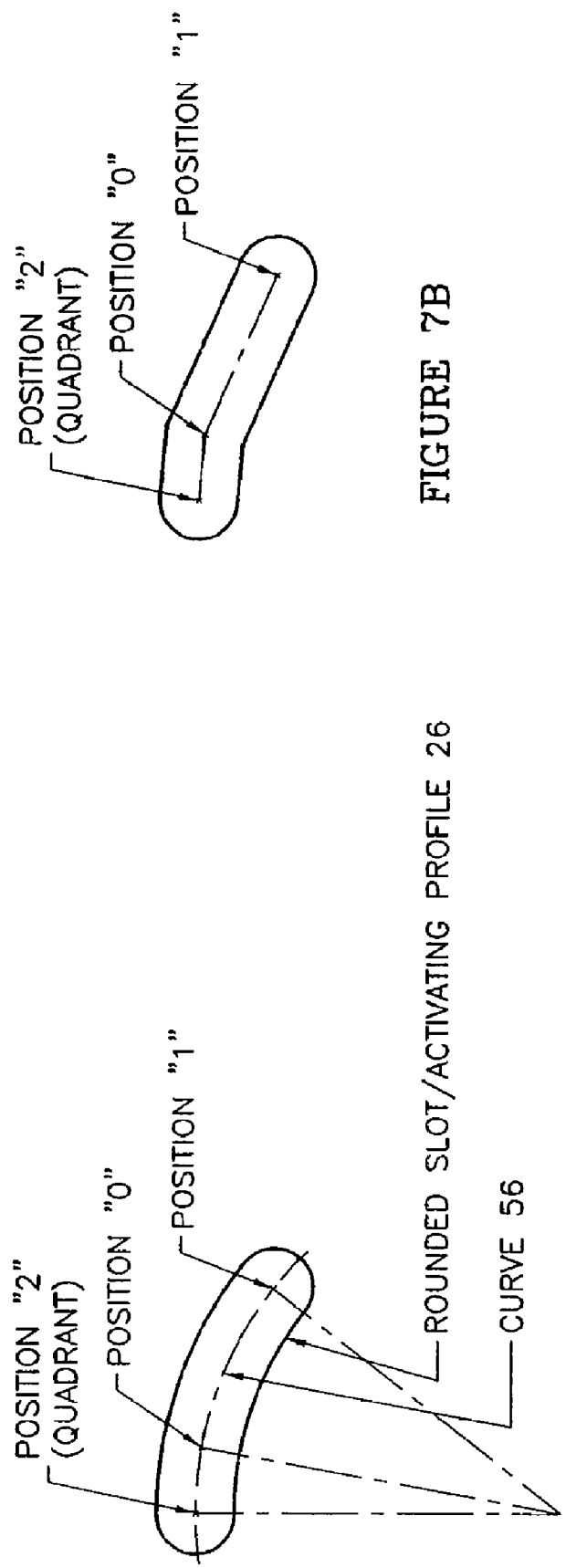
FIG. 7A is an exemplary schematic diagram of a curved activating slot of the valve gate unit of FIG. 1.
FIG. 7B is an alternate exemplary schematic diagram of an activating slot of the valve gate unit of FIG. 1.
Figure 10:
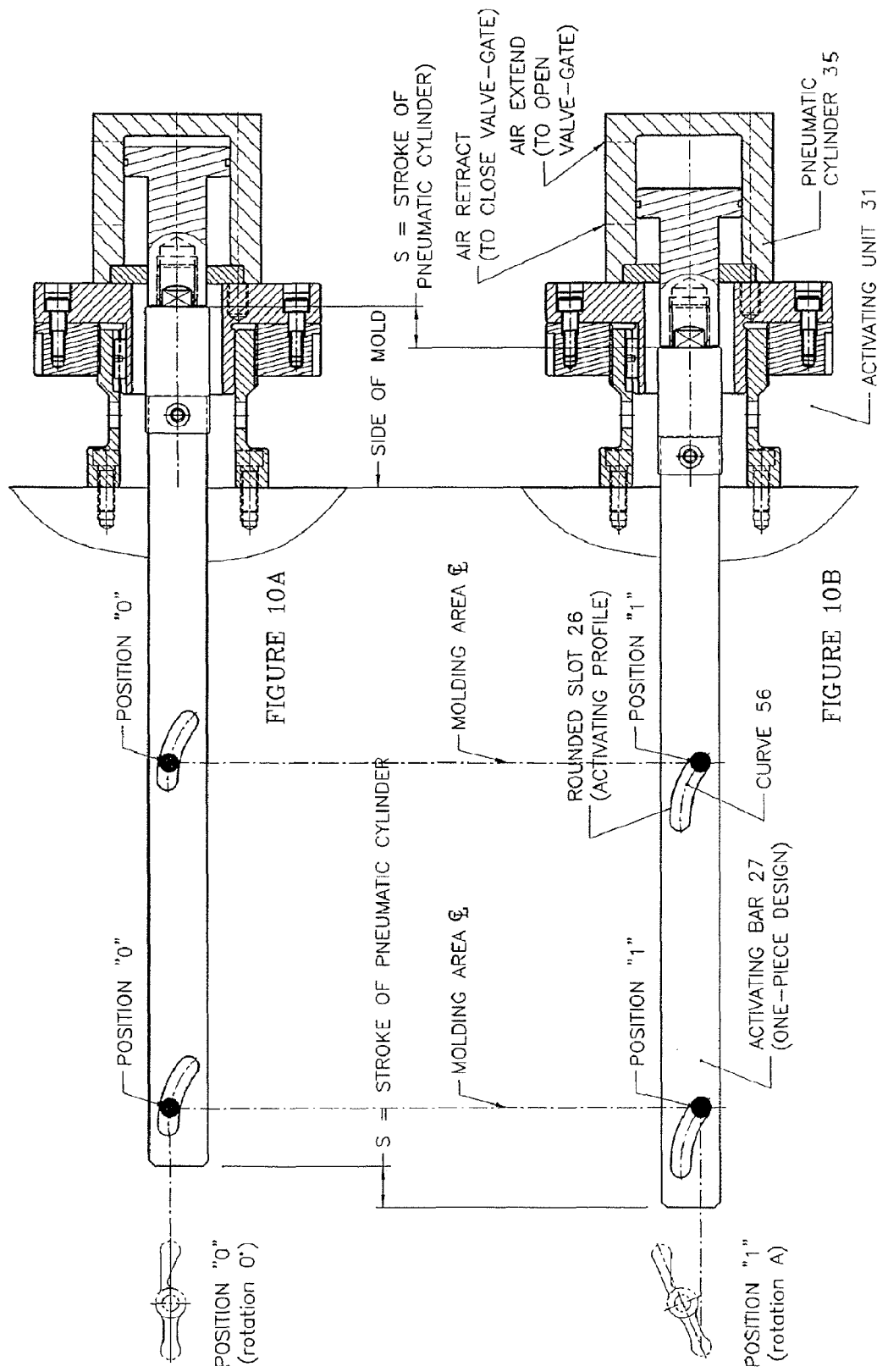
FIGS. 10A-B are exemplary schematic diagrams showing engagement positions of the activating rod on the slot of FIG. 7A.

The 3 positions on curve 56 (as shown in FIG. 7A), are next described, with correlation to FIGS. 8, 9, 10A, and 10B. In the case described here, curve 56 is an arc (e.g., a portion of a circle).

Position "0" (zero), also shown in FIGS. 8 and 10A, corresponds to valve-gate being closed (when injection is stopped). Piston 47, connector 50 and activating bar 27 are fully retracted (FIG. 10A), which corresponds to 0° rotation of yoke 22. In this position, forked end 24 of yoke 22 is lowered, bringing valve pin flush with surrounding surface of injection chamber 13.

Position "1", also shown in FIGS. 9 and 10B, corresponds to valve-gate being fully opened (when injection is in progress). Piston 47, connector 50 and activating bar 27 are extended at full stroke S (FIG. 10B), which corresponds to rotation "A" of yoke 22. In this position, forked end 24 of yoke 22 is lifted at maximum, retracting valve pin 15 by amount "B" (FIG. 9). Note: Spherical end 25 of yoke 22 moves repeatedly from "0" to "1" and back to "0" during mold cycles (once per mold cycle).

Position "2" is at the quadrant of curve 56 traveled by spherical end 25 of yoke 22. Valve pin 15 can be adjusted to move towards injection chamber 13 (to bring it flush with surrounding surface, or to eliminate plastic leaks at gate, etc.) by moving spherical end 25 of yoke 22 anywhere between "0" and "2". Quadrant "2" is the highest position the spherical end 25 can reach, and corresponds to the furthest out the valve pin 15 can go towards injection chamber 13. If spherical end 25 of yoke 22 is at "2" and valve pin is below surrounding surface of injection chamber 13, it cannot be adjusted any further and will need to be replaced with a longer pin.

Stroke S is an in-built feature of pneumatic cylinder 35 used, and its value is thus typically a constant. Values "A" and "B" are a result of the combination of stroke S of pneumatic cylinder 35 used, geometry of curve 56, and shape and size of yoke 22. These values can be varied depending on desired result.

Procedure to adjust activating unit:

In order to adjust the activating unit, the following procedure may be followed:

1. Mold is stopped.
2. Shoulder bolts 42 are loosened slightly (but not removed) to allow a little clearance between adjustable cylinder support 34 and adjusting nut 33.
3. Adjusting nut 33 is rotated while adjustable cylinder support 34 is slowly pulled away from (or moved inward into) base guide 32, as shoulder bolts 42 bolted in adjusting nut 33 rotate in annular groove 57 of adjustable cylinder support 34. This movement increases or reduces adjustment gap 58 between front of base guide 32 and flanged portion of adjustable cylinder support 34.
4. Indentations 45 of adjusting nut 33 help mold operator control the adjustment precision in reference with the origin indentation 59 of adjustable cylinder support 34.
5. When desired adjustment has been reached, shoulder bolts 42 are tightened, locking adjusting nut 33 and adjustable cylinder support 34 together. When these two items are locked together, they are also locked into position, in reference to base guide 32. This is achieved by the combination of transversal key 40 and thread 38. As transversal key 40 allows only axial movement of adjustable cylinder support 34 in reference to base guide 32, when shoulder bolts 42 are tightened, they also force the threads of adjusting nut 33 against the opposing threads of base guide 32, resulting in a solid, precise engagement of all the components of activating unit 31.

6. Steps 2, 3, 4, and 5 are repeated for each activating unit 31 mounted on mold, depending on performance of valve pins 15.
7. Once all activating units 31 have been adjusted, the mold can be started again.

A more detailed explanation of the correlation between adjustment on activating unit 31 and location of spherical end 25 of yoke 22 on curve 56 follows, in reference with FIGS. 7A, 7B, 8, 9, 10A and 10B. Position "1" is at the bottom of rounded slot/activating profile 26. Position "0" is located, along the length of the activating bar 27, at a distance, from "1", equal to the stroke S of pneumatic cylinder 35. Position "2" is always at the quadrant of curve 56. When adjustment gap 58 is altered (unit 31 is being adjusted), adjusting nut 33, adjustable cylinder support 34, and pneumatic cylinder 35 move relative to base guide 32, bringing connector 50 and activating bar 27 with them. This means that adjustments modify location of position "0" relative to position "2" on curve 56. Since distance, along length of activating bar 27, between "0" and "1" is constant (equal to stroke S of pneumatic cylinder 35), position "1" also moves with every adjustment. Valve pin 15 will need to be replaced with a longer one when it requires adjustment beyond position "2".

A feature of curve 56 (of rounded slot/activating profile 26) that influences the closing speed of valve pin 15 is discussed below, with reference to FIGS. 7A and 7B. When spherical end 25 of yoke 22 moves along curve 56 from "1" to "0", its speed decreases as the angle of the curve reduces. This translates into the valve pin slowing down slightly as it reaches the gate, allowing for a smooth closing. For comparison purposes, FIG. 7B shows a straight activating slot 26 (straight from "1" to "0"), which would result in a constant closing speed of the valve pin 15.

For comparison purposes, FIG. 10A shows activating unit 31, complete with activating bar 27, in position "0", while FIG. 103B (below it) shows same system in position "1". Piston 47 is retracted in FIG. 10A, bringing spherical end 25 of yoke 22 in position "0", and extended in FIG. 10B, bringing spherical end 25 in position "1". Yoke 22 is shown at the left of the figures for clarity.

One embodiment of this invention is directed to the use of a one-piece activating bar 27, the distance between activating slots 26 being determined by the pitch of the mold. An alternate embodiment, however, uses a multi-piece activation bar (FIGS. 14, 15), where the activating profile 26 is part of an activating insert 60, made of high-wear material. The mold pitch influences the length of connecting bars 61 that connect activating inserts 60. As shown in FIGS. 16 through 20, slotted activating inserts 60 and connecting bars 61 have a tongue-and-groove style joint 62, locked with a transversal key 63 of square section. Transversal key 63 has a cylindrical extension 64 with a groove 65. A washer 66 and a retaining ring 67 (pushed in groove 65) lock the transversal key 63 in place, which in turn locks the slotted activating inserts 60 in connecting bars 61 and in activating bar 27. Transversal key 63 has a knurled cylindrical flange 68 at opposite end, which is used for handling.

Figure 11:
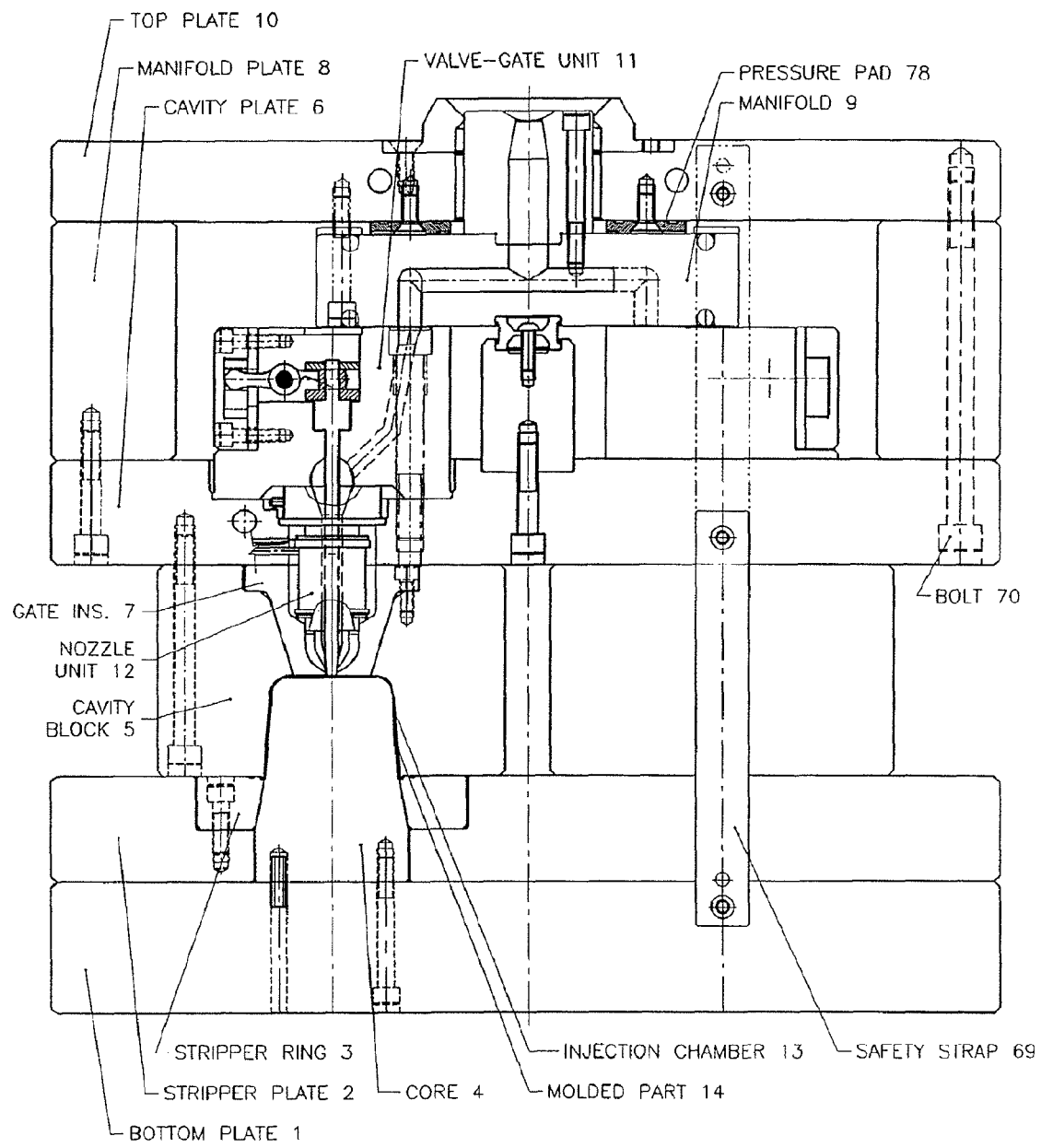
FIGS. 11-13 are exemplary schematic diagrams of alternate embodiments of a valve gate unit in accordance with the present invention shown as a part of a single-face multi-cavity mold.
Figure 12:
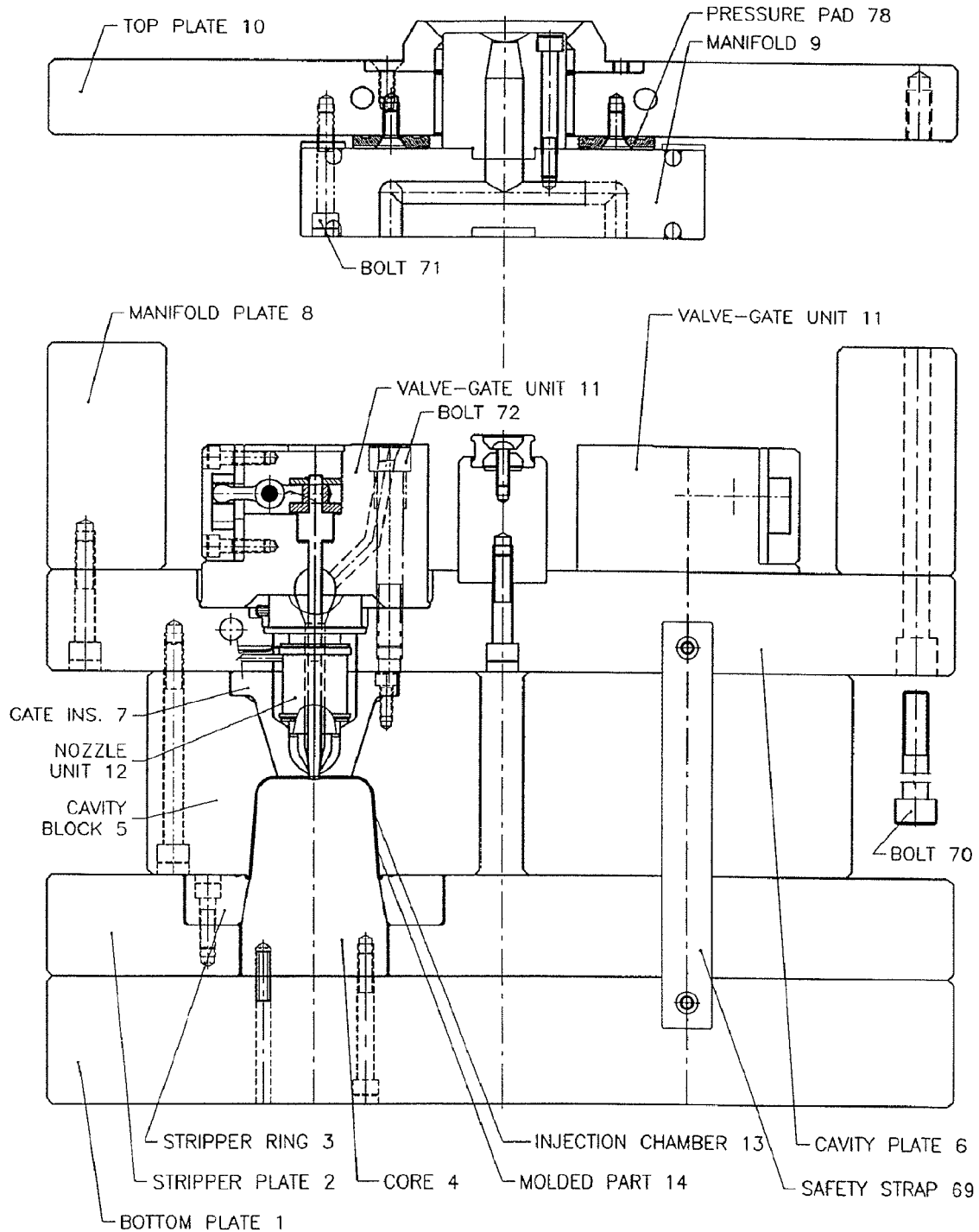
Figure 13:
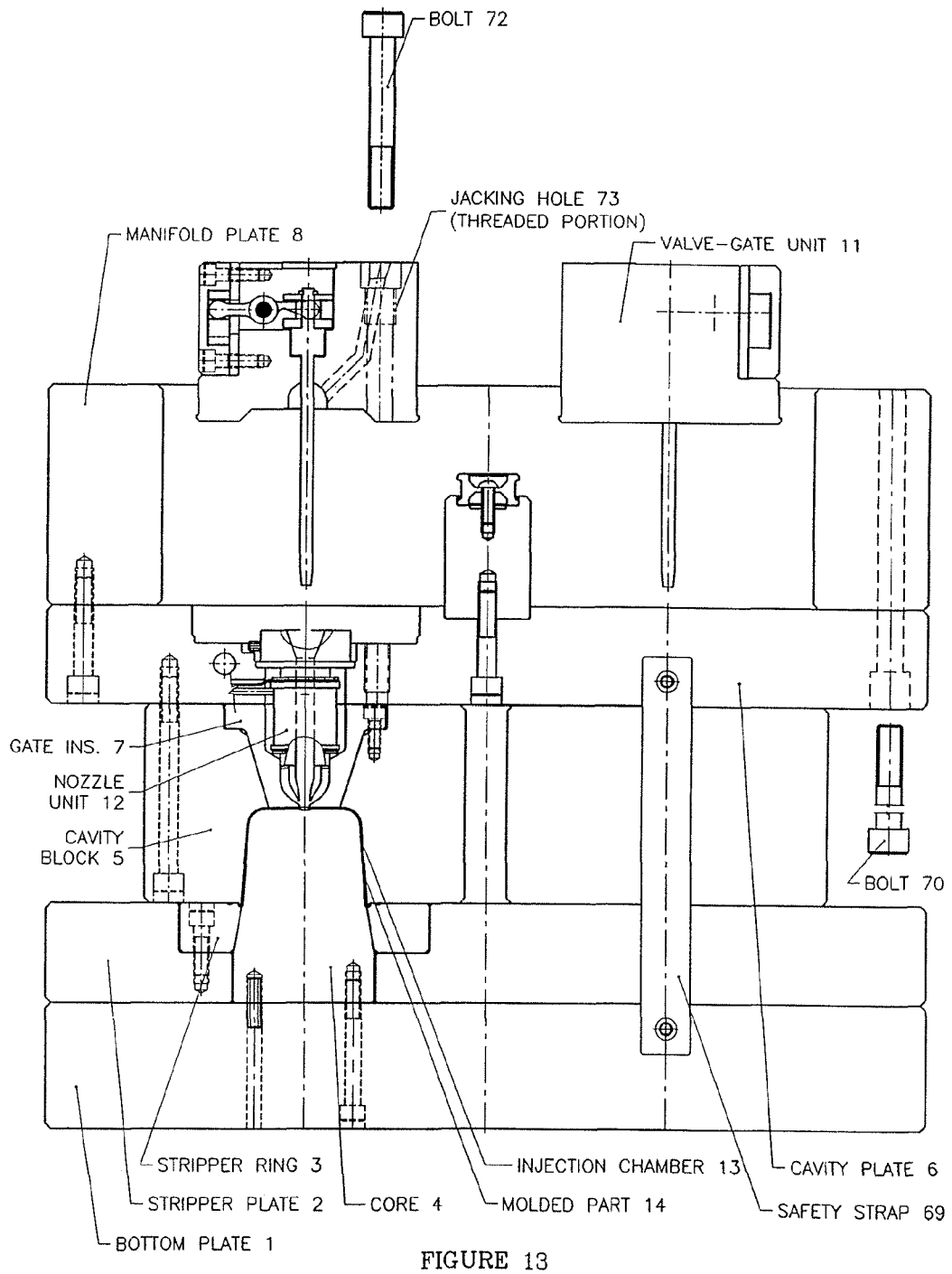

The multi-piece embodiment has several advantages in regards to servicing of the valve-gate unit. For a single-face mold (as shown in FIGS. 11, 12 and 13) the procedure to service the valve-gate unit is as follows:

1. Mold is closed in the injection machine. Valve-gates must be closed (pistons 47 of pneumatic cylinders 35 are fully retracted).
2. Safety straps 69 are installed between top plate 10 and cavity plate 6 (shown with phantom lines). Mold is opened and bolts 70 are removed. Mold is closed again.
3. Safety straps 69 are then installed between cavity plate 6 and bottom plate 1.
4. Mold is opened slowly, as shown in FIG. 12, bringing cavity plate 6, manifold plate 8 (which is secured to cavity plate 6), and valve-gate units 11 (secured to cavity plate 6) with the core half, away from cavity side.
5. Manifold 9 stays with top plate 10, as it is secured to top plate 10 with bolts 71.
6. When mold is opened this way, valve-gate units 11 are exposed and can be removed, one at a time, for service, cleaning etc. To do that, bolts 72 (that secure valve-gate unit 11 to cavity plate 6) can be removed, as shown in FIG. 13. Retaining rings 66 (see FIG. 20) are removed from grooves 65 of cylindrical extensions 64, and transversal keys 63 are then removed. Slotted activating insert 60 can then be easily disengaged from connecting bars 61 (which will stay in the mold, attached to adjacent valve-gate units) and valve-gate unit 11 (together with its activating insert 60) can be lifted out of the mold, using threaded portion of holes for bolts 72 as jacking holes 73. After changes, cleaning, service etc. valve-gate unit 11 can be returned to the mold and secured back in it, in reverse order. Another valve-gate unit 11 can then be removed in the same manner.

Figure 14:
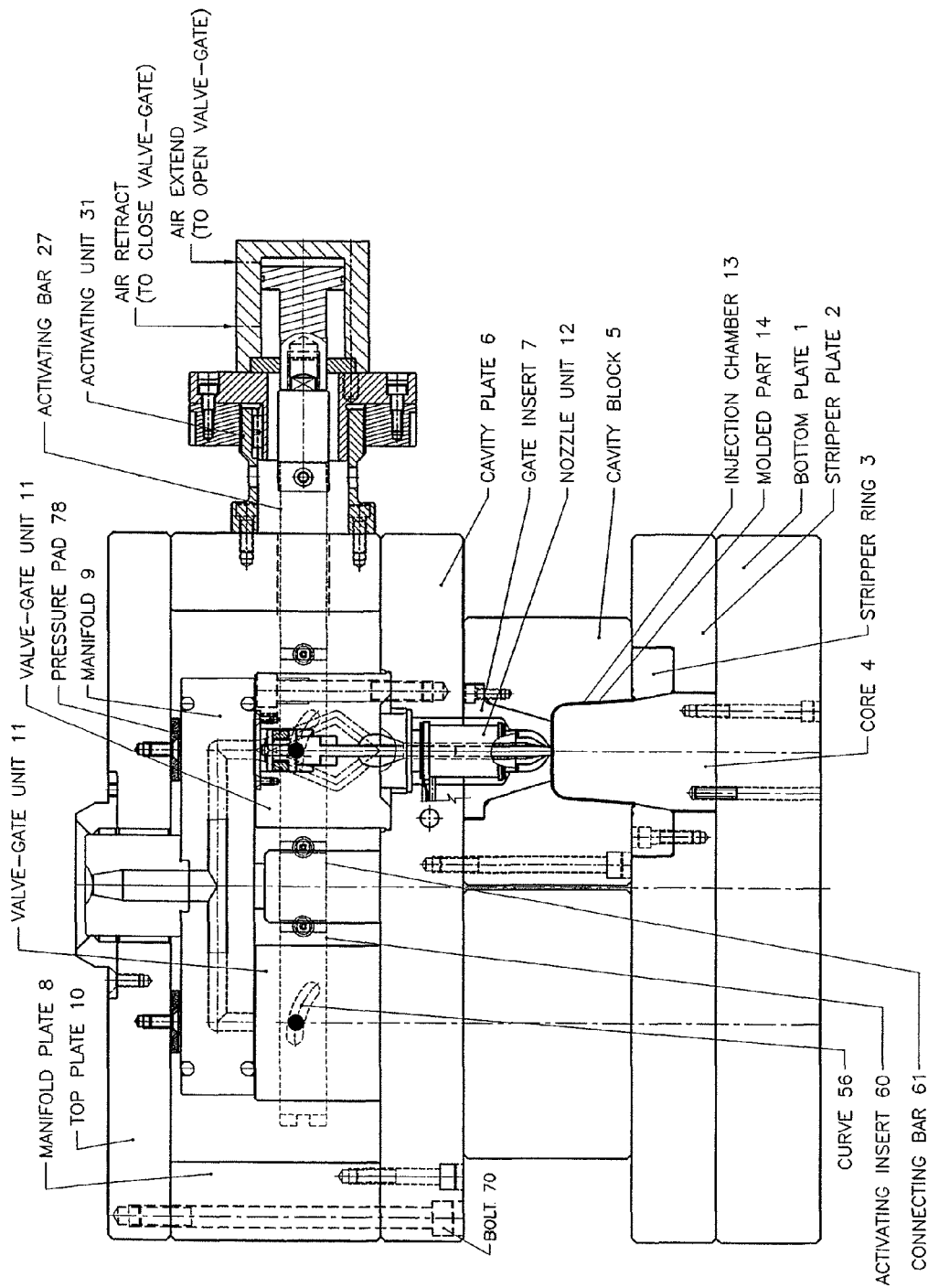
FIG. 14 is an exemplary side view schematic diagram of an alternate embodiment of a valve gate unit and the activating unit having a multi-piece activation bar in accordance with the present invention shown as a part of a single-face multi-cavity mold.
Figure 15:
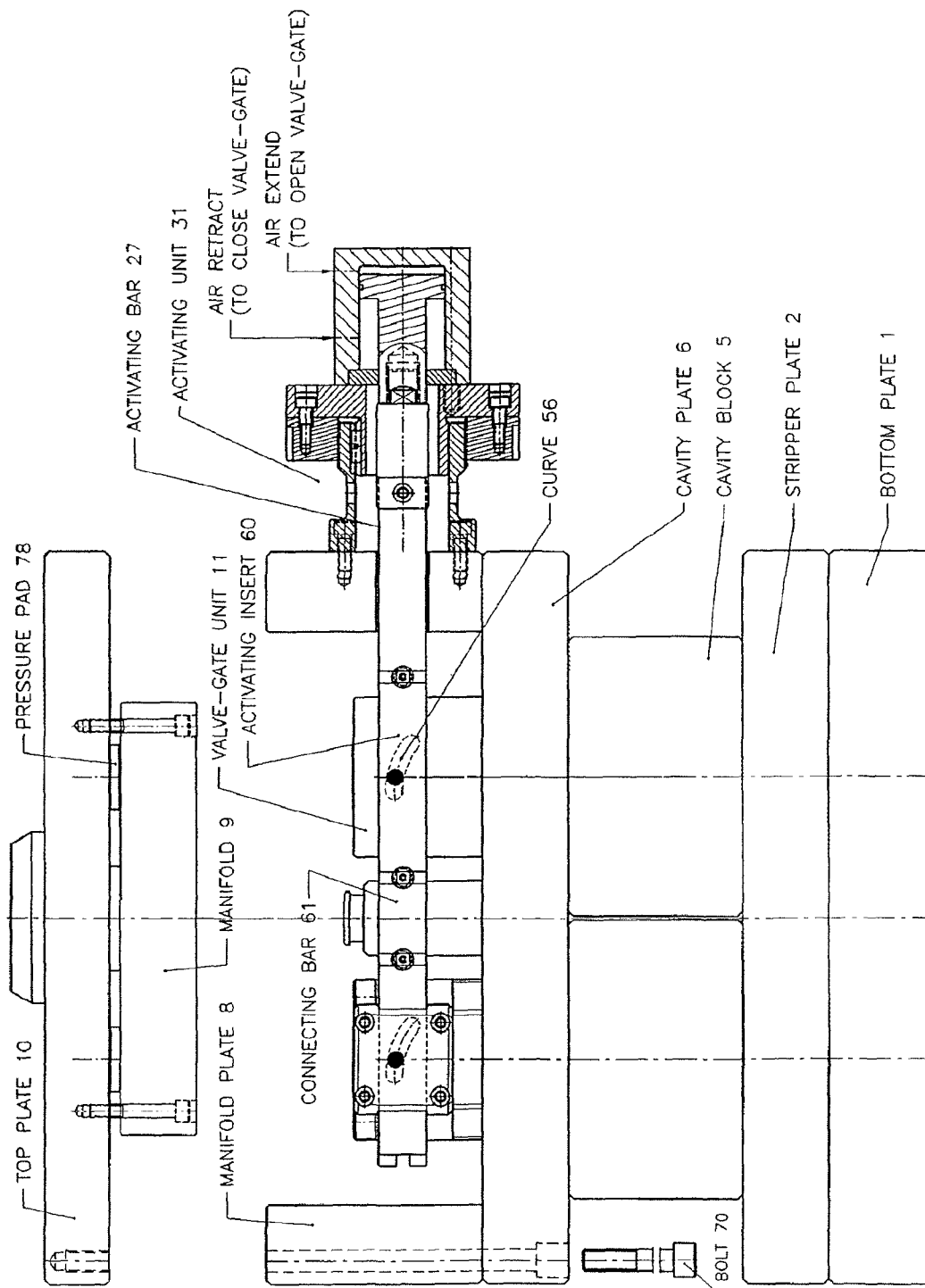
FIG. 15 is an exemplary schematic diagram showing engagement positions of the activating rod of FIG. 14.
Figure 16:
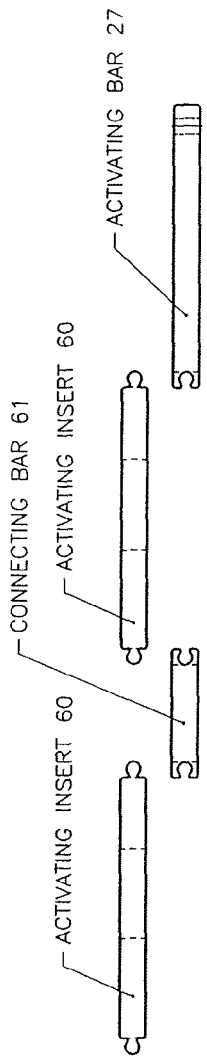
FIGS. 16-19 are exemplary detailed view schematic diagrams of the multi-piece activation bar of FIG. 14; with activating inserts and connecting bars shown separated in a top view (FIG. 16); front view (FIG. 17) and assembled shown in top view (FIG. 18) and front view (FIG. 19).
Figure 17:
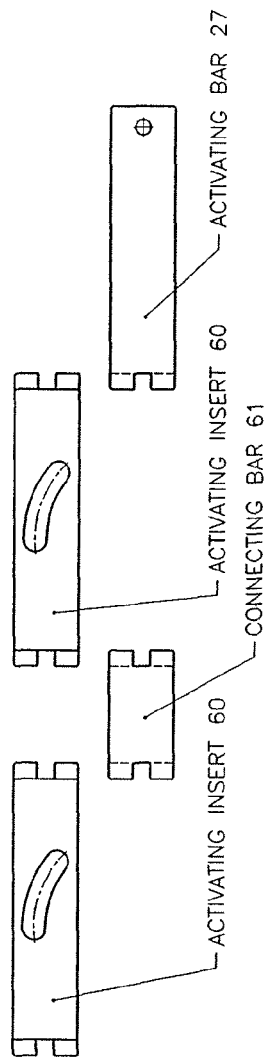
Figure 18:
Figure 19:
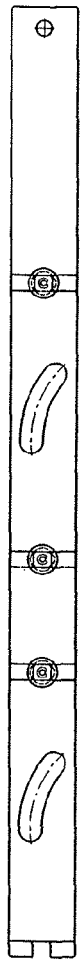
Figure 20:
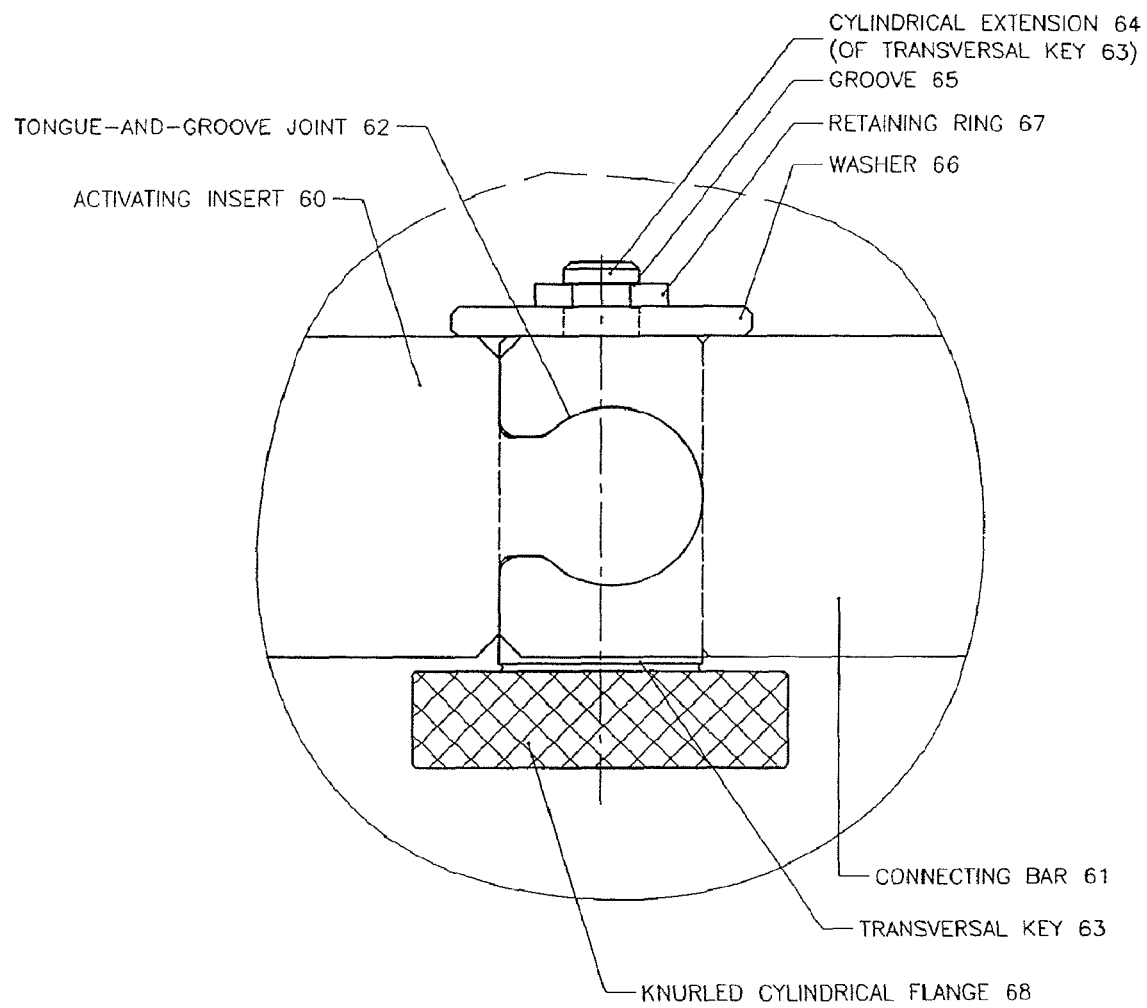
FIG. 20 is an exemplary detailed schematic diagram of a connection of the pieces of the multi-piece activation bar of FIG. 14.

FIG. 14 shows a side view of a single-face multi-cavity mold, in closed position, using a multi-piece activating bar 27. FIG. 15 shows same mold being opened in the manner described above, for removal of valve-gate units 11. FIGS. 16 through 19 are detailed views of multi-piece activating bar 27, with activating inserts 60 and connecting bars 61 shown separated in top view (FIG. 16) and front view (FIG. 17), and assembled (complete with transversal keys 63, washers 66, and retaining rings 64), shown in top view (FIG. 18) and front view (FIG. 19).

Figure 21:
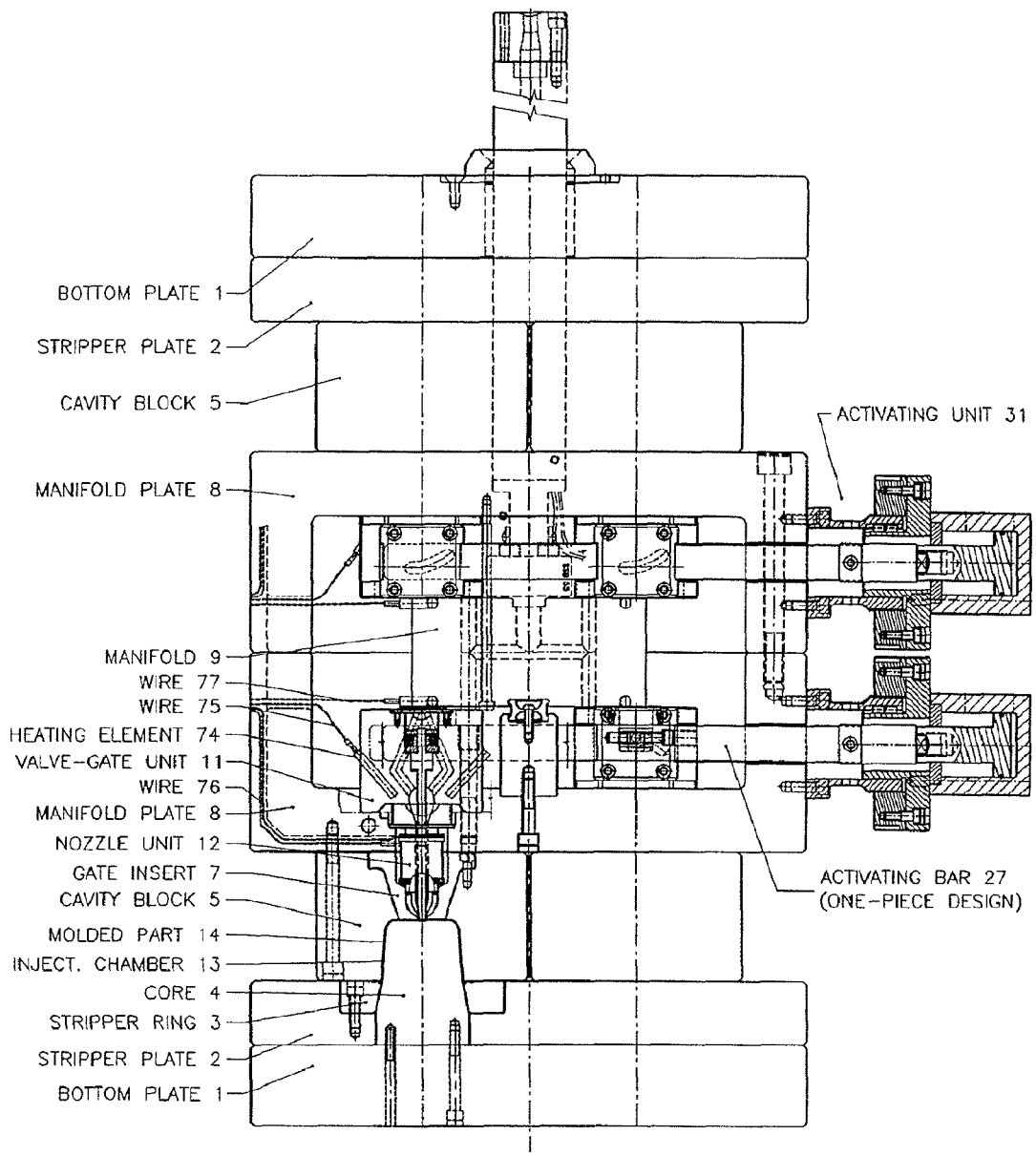
FIG. 21 is an exemplary cross sectional diagram through a stack mold using back-to-back gating.

FIG. 21 shows a cross section through a stack mold using back-to-back gating. Valve-gate units 11 are shown, complete with activating bar 27 (one-piece option shown) and activating units 31 mounted to side of mold. Valve-gate units 111 are be heated, to hold desired temperature of molten plastic as it transits from manifold 9 to nozzle unit 12. Different types of heating elements 74 can be used (coil heaters wrapped around body of valve-gate unit 11, or bar-type heaters inserted in the body of the valve-gate unit 11 as shown in FIG. 21, etc.). Wires 75 extending from heaters 74 are directed through pockets in the mold, similar with wires 76 coming from nozzle unit 12, and wires 77 coming from heaters of manifold 9.

Figure 22A:
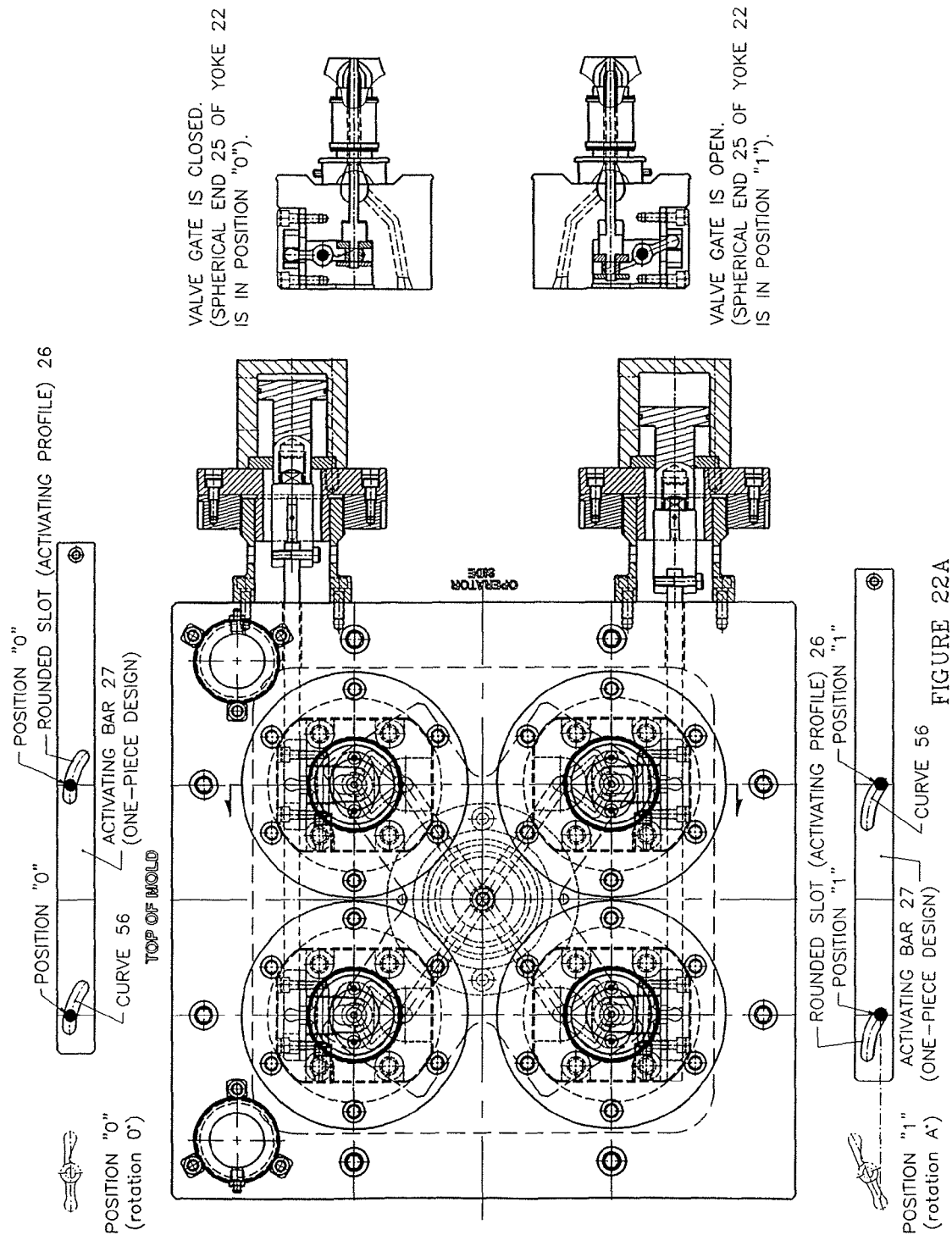
FIG. 22A is an exemplary plan view diagram of a multi-cavity mold (seen from the parting line), shown with two activating units.

FIG. 22A is a plan view of a multi-cavity mold (seen from the parting line), shown with two activating units 31. The two cavities at the bottom of the mold are shown with valve-gate open (one-piece activating bar 27 is extended at full stroke S of pneumatic cylinder 35, as shown just below the plan view). The two cavities at the top of the mold are shown with valve-gate closed (activating bar 27 is retracted fully, as shown above the plan view). At the right of the page, valve gate units, complete with nozzle units, are shown open (bottom) and closed (top), corresponding to plan view.

Figure 22B:
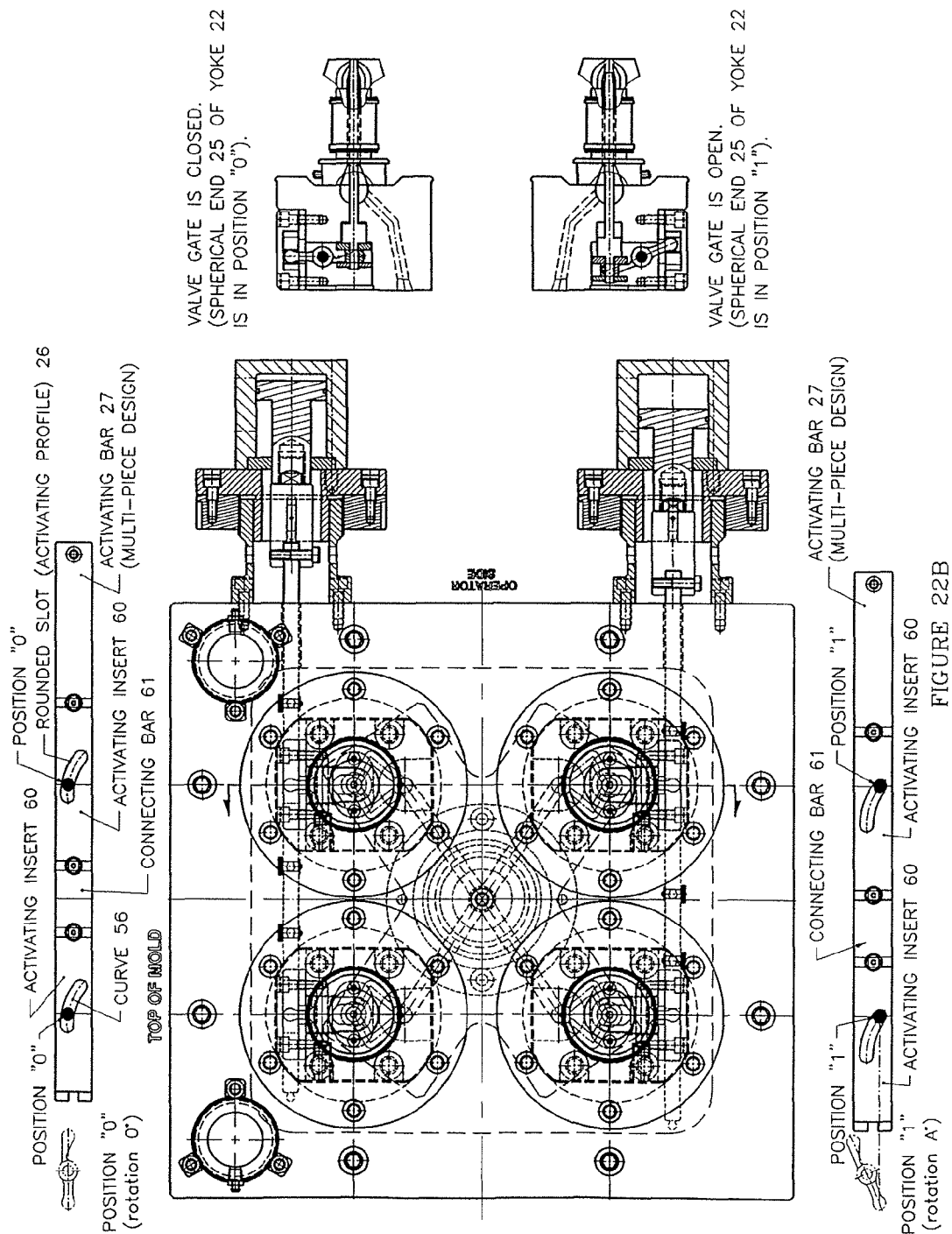
FIG. 22B is an alternate exemplary plan view diagram of a multi-cavity mold (seen from the parting line), shown with two activating units and using a multi-piece activating bar.
Figure 22C:
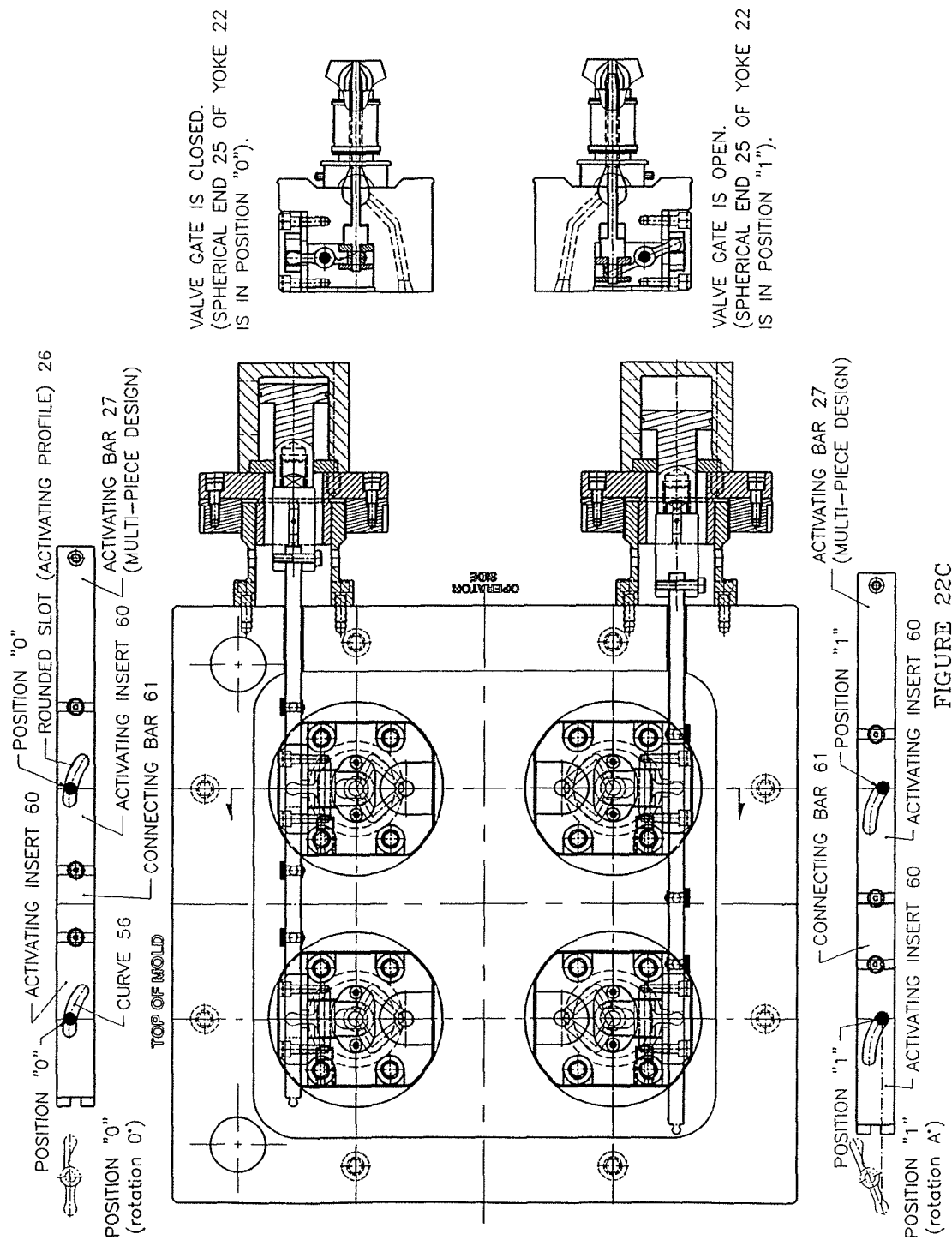
FIG. 22C is an alternate plan view diagram of FIG. 22B, seen from an opposite end.

FIG. 22B shows the same mold in plan view, but using a multi-piece activating bar 27. FIG. 22C is a plan view of the same mold from FIG. 22B, seen from opposite end—after top plate 10 and manifold 9 are removed. The valve-gate units 11 and multi-piece activating bars 27 are visible, and valve-gate units 11 can be removed, one by one, as previously described.

Figure 23:
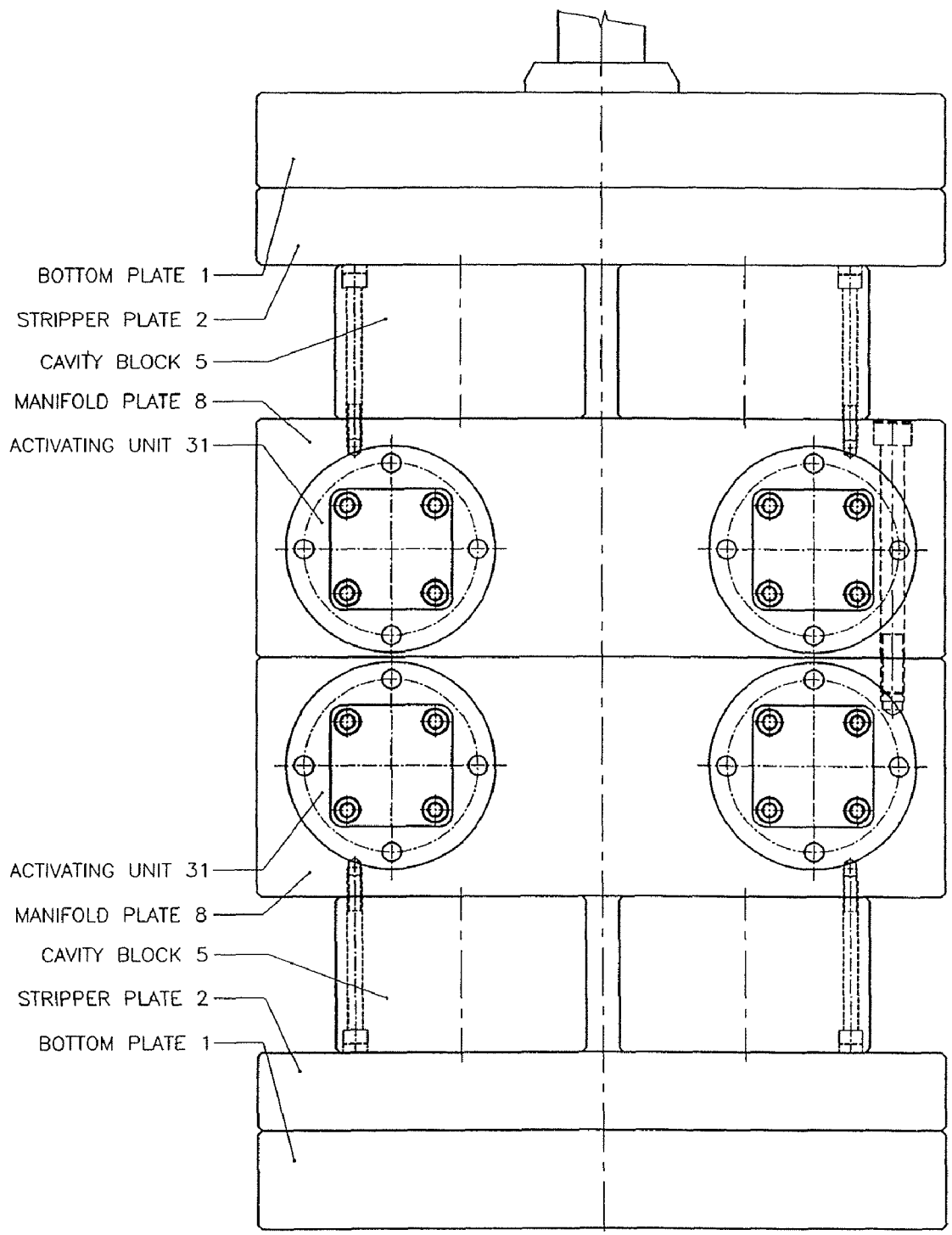
FIG. 23 is an exemplary side view diagram of a stack mold, shown from the side where the activating units are mounted.

FIG. 23 is a side view of a stack mold, shown from the side where the activating units 31 are mounted.

FIGS. 24A-C are exemplary schematic diagrams showing a first alternate embodiment of the valve gate unit in accordance with the present invention.

The embodiment of FIGS. 24A-C uses a pair of activating bars 27' working in parallel as a rigid unit. They can be of either one-piece or multi-piece design, and are connected in a rigid assembly by means known to those of skill in the art. An activating unit 31', mounted externally on the injection mold, activates both bars 27' simultaneously. A pair of bars 27' may activate one or several valve gate units 11' located along the same axial line. Cover caps 28', secured to opposing sides of the body of valve gate unit 11', act as guides for activating bars 27'. Each activating bar has a slot/activating profile 26' for each valve gate unit 11' activated. This embodiment shows a linear, sloped slot, but it should be understood that a rounded slot such as those described above may be used.

The valve gate unit 11' of this embodiment has a round pocket 21', disposed centrally, opening to the side which comes in contact with manifold 9'. A cylindrical guide 80, in threaded engagement 81 with a cylindrical cage 82, is located in round pocket 21'. A valve stem 15' has a cylindrical flange 83, located centrally in cage 82. Flange 83 is firmly held between base of cage 82 and bottom of threaded extension of guide 80, with no freedom of axial motion. Guide 80, flange 83 of valve stem 15', and cage 82 form a sliding unit 84, which can move axially in pocket 21' to repeatedly close or open a valve gate opening into an injection chamber 13' of the injection mold. Such motion of the sliding unit is achieved by a transversal pin 85, fixedly engaged in guide 80, and having symmetrical extensions on sides of guide 80. Ends of transversal pin 85 pass through vertical slots 86 on sides of valve gate unit 11', continuing on through activating profiles 26', and being secured with some means such as retaining rings (as shown) against accidental sliding out of profiles 26'. With each extension of the piston 47' of a pneumatic cylinder 35' of activating unit 31', the pair of bars 27' extends, causing the activating profiles 26' to force transversal pins 85 to retract sliding units 84, so that valve stems 15' open the valve gates. With each retraction of the piston 47', the pair of bars 27' retracts, causing the activating profiles 26' to force transversal pins 85 to extend sliding units 84, so that valve stems 15' close the valve gates. Vertical slots 86 only allow extend/retract motions along axis of valve stem 15', preventing any sideway motions as could be caused by slots 26' of activating bars 27', acting against transversal pin 85. A cover plate 30', secured at the top of the valve gate unit 11', separates pocket 21' from manifold 9'.

FIGS. 25A-C show the embodiment of FIGS. 24A-C with the valve gate closed.

FIGS. 26A-C are simplified views of the embodiment of FIGS. 24A-C, shown with the valve gate open.

FIGS. 27A-C simplified views of simplified views of this embodiment, shown with the valve gate closed.

FIGS. 28A-C are exemplary schematic diagrams showing a second alternate embodiment of the valve gate unit in accordance with the present invention.

The embodiment shown in FIGS. 28A-C uses a pair of activating bars 27' working in parallel as a rigid unit. They can be of either one-piece or multi-piece design, and are connected in a rigid assembly by means known to those skilled in the art. An activating unit 31', mounted externally on the injection mold, activates both bars 27' simultaneously. A pair of bars 27' may activate one or several valve gate units 11' located along the same axial line. Rollers 87 and support pads 88 guide the extend/retract motions of bars 27', as activated by unit 31'. Activating bars 27' transfer this motion, through pins 89, to side arms 90, which transfer it further, through transversal pin 85', to a sliding unit 84' (similar to the one described above). Vertical slots 86' in opposite sides of valve gate unit 11' allow extend/retract motions of pin 85', as activated by bars 27'. Such motions of pin 85' are transferred directly to valve stem 15' through sliding unit 84'. When activating bars 27' are extended, they cause side arms 90 to pull pin 85' to the bottom end of slots 86'. Pin 85' brings the whole sliding unit 84' down, which causes the valve stem 15' to close the valve gate as shown in FIGS. 29A, B, and C. When activating bars 27' are retracted, they cause side arms 90 to push pin 85' to the top end of slots 86', bringing the whole sliding unit 84' up, and causing the valve stem 15' to open the valve gate (as shown in FIGS. 28A, B, and C).

FIGS. 29A-C show the embodiment of FIGS. 28A-C with the valve gate closed.

FIGS. 30A-C are simplified views of the embodiment of FIGS. 28A-C, with the valve gate open.

FIGS. 31A-C are simplified views of the embodiment of FIGS. 28A-C, with the valve gate closed.

FIGS. 32A-C are exemplary schematic diagrams showing a third alternate embodiment of the valve gate unit in accordance with the present invention.

The embodiment shown in FIGS. 32A-C uses a pair of activating bars 27' working in parallel as a rigid unit. They can be of either one-piece or multi-piece design, and are connected in a rigid assembly by means known to those of skill in the art. An activating unit 31', mounted externally on the injection mold, activates both bars 27' simultaneously. A pair of bars 27' may activate one or several valve gate units 11' located along the same axial line. Roller bearings 91 guide the extend/retract motions of bars 27', as activated by unit 31'. Activating bars 27' transfer this motion, through a toggle system 92, to a transversal pin 85', to a sliding unit 84' (similar to the one described above) and to a valve stem 15'. The toggle system 92 has of two side arms, 93 and 94, their connecting pins 95 and 96, and the transversal pin 85'. Pins 95 are fixedly secured onto opposite sides of the valve gate unit 11'. Pins 96 connect side arms 93 and 94, and are allowed motion in vertical slots 97 of activating bars 27'. Side arms 94 are further connected to ends of transversal pin 85'. Vertical slots 86' on opposite sides of valve gate unit 11' only allow pin 85' an extend/retract motion along axis of valve stem 15'. Such motions of pin 85' are transferred directly to valve stem 15' through sliding unit 84'. When activating bars 27' are extended, vertical slots 97 cause pins 96 to move simultaneously along horizontal direction of activating bars 27' and vertically towards bottom of slots 97 (which are open at the top). Since side arms 93 can only pivot around pins 95 (when actuated by activating bars 27'), the resulting combined horizontal/vertical motion of pins 96 causes side arms 94 to pull transversal pin 85' to bottom end of vertical slots 86'. Pin 85' transfers this motion to the sliding unit 84', causing the valve stem 15' to close the valve gate, as shown in FIGS. 33A, B, and C. When activating bars 27' are retracted, vertical slots 97 cause pins 96 to move simultaneously along horizontal direction of activating bars 27' and vertically towards top of slots 97. Side arms 93 pivot around pins 95, the resulting combined horizontal/vertical motion of pins 96 causes side arms 94 to push transversal pin 85' to top end of vertical slots 86'. Pin 85' transfers this motion to the sliding unit 84', causing the valve stem 15' to open the valve gate, as shown in FIGS. 32A, B, and C.

FIGS. 33A-C show the embodiment of FIGS. 32A-C with the valve gate closed.

FIGS. 34A-C are simplified views of the embodiment of FIGS. 32A-C, with the valve gate open.

FIGS. 35A-C are simplified views of the embodiment of FIGS. 32A-C, with the valve gate closed.

It should be noted that in all three alternate embodiments described above, S1 is the stroke of the activating bars 27', along a direction perpendicular to that of valve stem 15'. Sliding unit 84 and valve stem 15' have a stroke S2, along the centerline of the valve stem 15'. Both strokes are shown on FIGS. 24A, B and C of the first alternate embodiment. For the other two embodiments, however, only stroke S2 is shown, for clarity of the drawing. The two extreme positions of these embodiments (when valve is open and when valve is closed) were not shown on the same drawing to avoid unnecessarily cluttering the figures.

As will be understood by those skilled in the art, the present invention may be embodied in other specific forms without departing from the essential characteristics thereof. For example, instead of the pneumatic cylinder, a hydraulic one may be used may, or alternately the motive force may be supplied by an electric motor drive. These other embodiments are intended to be included within the scope of the present invention, which is set forth in the following claims.

What is claimed is:

1. A valve gate system for an injection molding machine, comprising:
   a valve gate unit configured to be in contact with a manifold of an injection molding machine for delivering a molten plastic flow from a hot runner system to an injection chamber,
   said valve gate unit having a valve pin for controlling the flow of the molten plastic from a hot runner system to an injection chamber, said valve pin connected substantially rigidly in the axial direction with a sliding unit; and
   an activating unit coupled with said valve gate unit, configured to be mounted external to a mold unit that houses the injection chamber,
   said activating unit having an element that extends through the mold unit to engage said sliding unit, so as to control valve pin, thus controlling the molten plastic flow from a runner system to an injection chamber, wherein said activating unit comprises one of a pneumatic and a hydraulic cylinder,
   wherein the piston of said cylinder is configured to engage a pair of substantially parallel activating bars of said element, said activating bars connected substantially rigidly and moving together, said activating bars each having an inclined slot configured to engage with a transversal pin, said transversal pin extending from said sliding unit, passing through vertical slots on the valve gate unit, and engaging with the inclined slots on the activating bars, such that a push-pull movement of the piston causes said transversal pin to slide in the inclined slots in the activating bars which in turn causes an up and down movement of said transversal pin inside the vertical slots, which in turn causes up and down movement of said sliding unit, which in turn causes an up and down movement of said valve pin.

2. A valve gate system for an injection molding machine of claim 1, wherein the molten plastic flow is delivered to the injection chamber through more than one channel, thus creating a split-flow configured to reduce dead spots which cause areas of stale plastic.

3. A valve gate system for an injection molding machine of claim 1, wherein said activating bars are chosen from a group consisting of a single piece bar, a multi piece bar, or a combination thereof.

4. A valve gate system for an injection molding machine of claim 1, wherein said inclined slots are chosen from a group consisting of: inclined slot, curved slot, or a combination thereof.

5. A valve gate system for an injection molding machine, comprising:
   a valve gate unit configured to be in contact with a manifold of an injection molding machine for delivering a molten plastic flow from a hot runner system to an injection chamber,
   said valve gate unit having a valve pin for controlling the flow of the molten plastic from a hot runner system to an injection chamber, said valve pin connected substantially rigidly in the axial direction with a sliding unit; and
   an activating unit coupled with said valve gate unit, configured to be mounted external to a mold unit that houses the injection chamber,
   said activating unit having an element that extends through the mold unit to engage said sliding unit, so as to control the valve pin, thus controlling the molten plastic flow from a runner system to an injection chamber, wherein said activating unit comprises one of a pneumatic and a hydraulic cylinder,
   wherein the piston of said cylinder is configured to engage a pair of substantially parallel activating bars of said element, said activating bars connected substantially rigidly and moving together, said activating bars guided along rollers on one side and support pad on the opposite side,
   said activating bars each having a pivotable arm configured to pivotably engage with the activating bar on one end and with a transversal pin on the opposite end, said transversal pin extending from said sliding unit, passing through vertical slots on the valve gate unit, and engaging with the pivotable arms on the activating bars, such that a push-pull movement of the piston causes said pivotable arm to push and pull said transversal pin within the vertical slots, which in turn causes up and down movement of said sliding unit, which in turn causes an up and down movement of said valve pin.

6. A valve gate system for an injection molding machine of claim 5, wherein the molten plastic flow is delivered to the injection chamber through more than one channel, thus creating a split-flow configured to reduce dead spots which cause areas of stale plastic.

7. A valve gate system for an injection molding machine of claim 5, wherein said activating bars are chosen from a group consisting of a single piece bar, a multi piece bar, or a combination thereof.

8. A valve gate system for an injection molding machine, comprising:
   a valve gate unit configured to be in contact with a manifold of an injection molding machine for delivering a molten plastic flow from a hot runner system to an injection chamber,
   said valve gate unit having a valve pin for controlling the flow of the molten plastic from a hot runner system to an injection chamber, said valve pin connected substantially rigidly in the axial direction with a sliding unit; and
   an activating unit coupled with said valve gate unit, configured to be mounted external to a mold unit that houses the injection chamber,
   said activating unit having an element that extends through the mold unit to engage said sliding unit, so as to control valve pin, thus controlling the molten plastic flow from a runner system to an injection chamber, wherein said activating unit comprises one of a pneumatic and a hydraulic cylinder, wherein the piston of said cylinder is configured to engage a pair of substantially parallel activating bars of said element, said activating bars connected substantially rigidly and moving together, said activating bars being guided along rollers on two opposite sides, said activating bars each having a first side arm and a second side arm, said first side arm configured to pivotably engage with the activating bar on one end and with the valve gate unit on the opposite end, said second side arm configured to pivotably engage with the activating bar on one end and with a transversal pin on the opposite end, said transversal pin extending from said sliding unit, passing through vertical slots on the valve gate unit, and pivotably engaging with said first and second side arms on the activating bars, such that a push-pull movement of the piston causes said pivotable arms to push and pull said transversal pin within the vertical slots, which in turn causes an up and down movement of said sliding unit, which in turn causes an up and down movement of said valve pin.

9. A valve gate system for an injection molding machine of claim 8, wherein the molten plastic flow is delivered to the injection chamber through more than one channel, thus creating a split-flow configured to reduce dead spots which cause areas of stale plastic.

10. A valve gate system for an injection molding machine of claim 8, wherein said activating bars are chosen from a group consisting of a single piece bar, a multi piece bar, or a combination thereof.

* * * * *